United States Patent
Sato

(10) Patent No.: US 11,894,867 B2
(45) Date of Patent: Feb. 6, 2024

(54) TRANSMISSION DEVICE AND ELECTRONIC DEVICE

(71) Applicant: FUJITSU LIMITED, Kawasaki (JP)

(72) Inventor: Masaru Sato, Isehara (JP)

(73) Assignee: FUJITSU LIMITED, Kawasaki (JP)

( * ) Notice: Subject to any disclaimer, the term of this patent is extended or adjusted under 35 U.S.C. 154(b) by 158 days.

(21) Appl. No.: 17/678,611

(22) Filed: Feb. 23, 2022

(65) Prior Publication Data

US 2022/0376717 A1    Nov. 24, 2022

(30) Foreign Application Priority Data

May 20, 2021  (JP) .................................. 2021-085210
Nov. 26, 2021  (JP) .................................. 2021-191908

(51) Int. Cl.
*H04B 1/04* (2006.01)
*H04B 1/00* (2006.01)

(52) U.S. Cl.
CPC ......... *H04B 1/0458* (2013.01); *H04B 1/0057* (2013.01); *H04B 1/0483* (2013.01)

(58) Field of Classification Search
CPC .......... H04B 1/0057; H04B 1/02; H04B 1/04; H04B 2001/0408; H04B 1/0458; H04B 1/0475; H04B 1/0483
See application file for complete search history.

(56) References Cited

U.S. PATENT DOCUMENTS

| | | | |
|---|---|---|---|
| 6,728,517 B2* | 4/2004 | Sugar .................... | H04B 1/0057 455/272 |
| 6,915,117 B2* | 7/2005 | Chominski .............. | H04B 1/40 455/260 |
| 8,913,968 B2* | 12/2014 | Mirzaei ................ | H04B 1/0475 455/114.1 |
| 9,595,919 B2* | 3/2017 | Rajendran ................ | H04B 1/04 |
| 11,431,358 B2* | 8/2022 | Park ......................... | H04B 1/04 |

FOREIGN PATENT DOCUMENTS

| | | |
|---|---|---|
| JP | 11-004122 A | 1/1999 |
| JP | 2011-244393 A | 12/2011 |
| JP | 2014-236491 A | 12/2014 |

\* cited by examiner

*Primary Examiner* — Quochien B Vuong
(74) *Attorney, Agent, or Firm* — ArentFox Schiff LLP

(57) ABSTRACT

A transmission device includes a signal source configured to output a local signal with a first frequency, a first amplifier configured to amplify the local signal output from the signal source, a first mixer configured to mix a first input signal with an intermediate frequency and the local signal amplified by the first amplifier and to output a first output signal, and a second mixer configured to mix the first output signal output from the first mixer and the local signal amplified by the first amplifier and to output a second output signal.

18 Claims, 17 Drawing Sheets

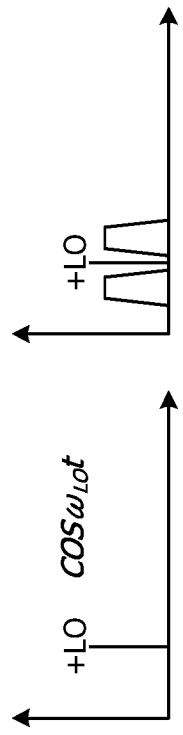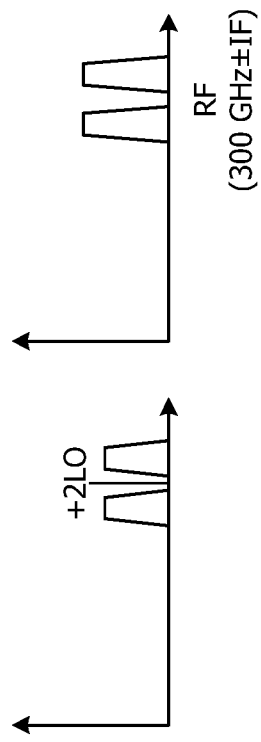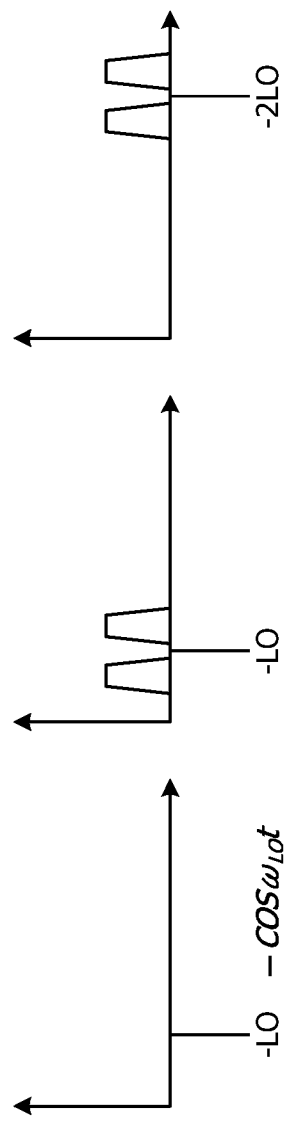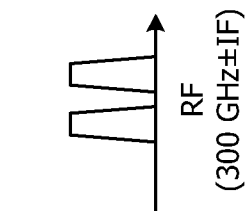

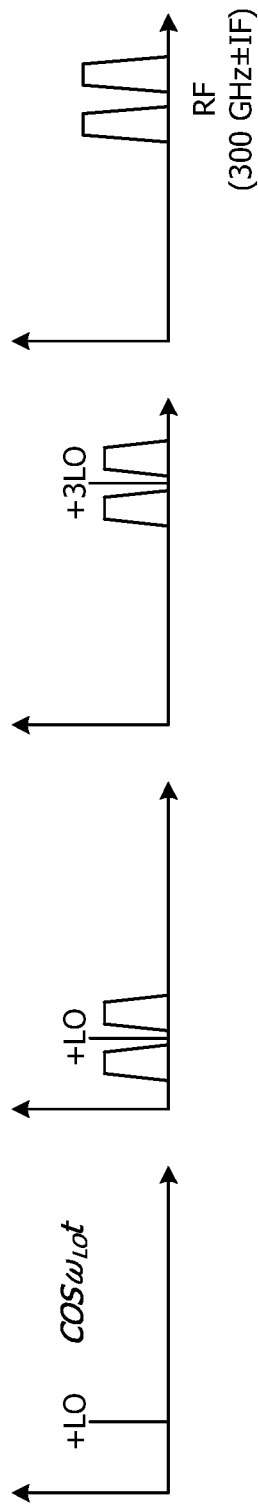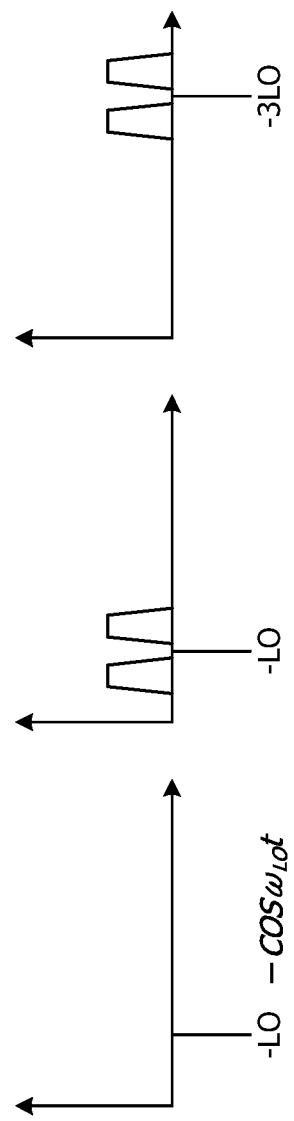

_US 11,894,867 B2_

TRANSMISSION DEVICE AND ELECTRONIC DEVICE

CROSS-REFERENCE TO RELATED APPLICATION

This application is based upon and claims the benefit of priority of the prior Japanese Patent Application Nos. 2021-191908, filed on Nov. 26, 2021, and 2021-85210, filed on May 20, 2021, the entire contents of which are incorporated herein by reference.

FIELD

The present disclosure discussed herein is related to a transmission device and an electronic device.

BACKGROUND

There is a transmission device that includes a first modulator that mixes a first baseband signal and an intermediate frequency signal and generates a second baseband signal and a second modulator that mixes the second baseband signal and a locally oscillated signal and generates a high frequency signal, and a frequency of the locally oscillated signal is a frequency that is a sum or a difference of a carrier frequency of the high frequency signal and a frequency of the intermediate frequency signal.

Japanese Laid-open Patent Publication No. 2014-236491 is disclosed as related art.

SUMMARY

According to an aspect of the embodiments, a transmission device includes a signal source configured to output a local signal with a first frequency, a first amplifier configured to amplify the local signal output from the signal source, a first mixer configured to mix a first input signal with an intermediate frequency and the local signal amplified by the first amplifier and to output a first output signal, and a second mixer configured to mix the first output signal output from the first mixer and the local signal amplified by the first amplifier and to output a second output signal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 15A to 15G are diagrams illustrating an example of a waveform of a signal obtained by each unit of the transmission device 300;

FIGS. 17A to 17G are diagrams illustrating an example of a waveform of a signal obtained by each unit of the transmission device 300M.

DESCRIPTION OF EMBODIMENTS

A semiconductor device implemented by a semiconductor is often used for a circuit of an amplifier or the like of such a transmission device. However, there is an upper limit of a frequency at which the semiconductor device can operate. Therefore, in a case where there is a need for operating a transmission device in a frequency band exceeding the upper limit frequency of the semiconductor device, it is difficult that a typical transmission device copes with this case.

An embodiment of a technology that can output a transmission signal in the frequency band exceeding the upper limit frequency of the semiconductor device will be described.

First Embodiment

Figure 1:
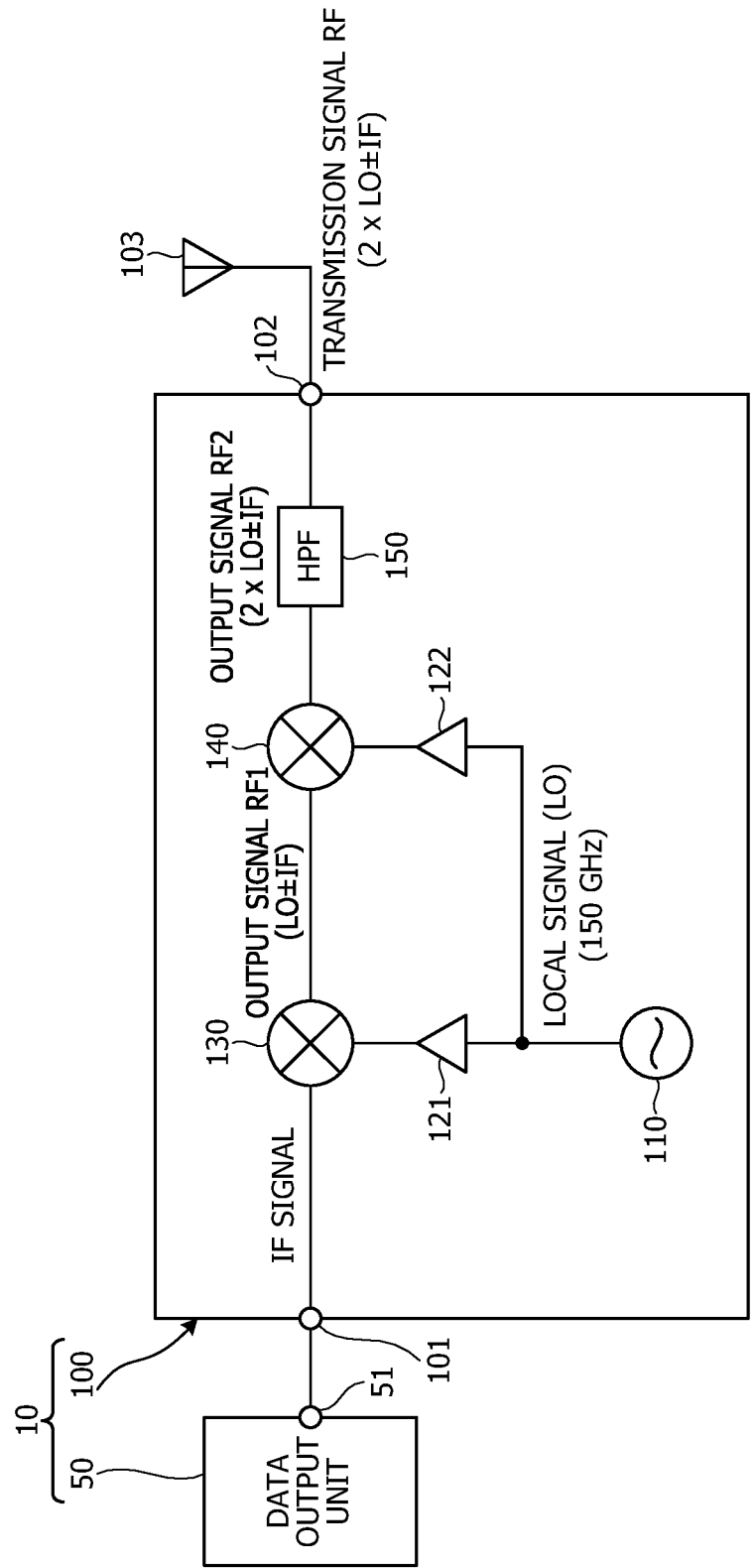
FIG. 1 is a diagram illustrating a configuration of an electronic device 10 including a transmission device 100 according to a first embodiment.

FIG. 1 is a diagram illustrating a configuration of an electronic device 10 including a transmission device 100 according to a first embodiment. The electronic device 10 includes a data output unit 50 and a transmission device 100. The electronic device 10 is, for example, a smartphone, a tablet computer, other mobile devices having communication functions, or the like.

The data output unit 50 is achieved by a computer including a Central Processing Unit (CPU), a Random Access Memory (RAM), a Read Only Memory (ROM), an input/output internal, an internal bus, or the like. The data output unit 50 includes an output terminal 51, and the output terminal 51 is connected to an input terminal 101 of the transmission device 100. The data output unit 50 generates an Intermediate Frequency (IF) signal on the basis of data generated according to an operation of the electronic device 10 and outputs the signal from the output terminal 51. A frequency of the IF signal is 10 GHz as an example. The IF signal is an example of a first input signal with an intermediate frequency.

The transmission device 100 includes the input terminal 101, an output terminal 102, a signal source 110, amplifiers 121 and 122, mixers 130 and 140, and a High Pass Filter (HPF) 150. The amplifiers 121 and 122 are examples of a first amplifier. Here, a mode in which the first amplifier includes the two amplifiers 121 and 122 will be described. Furthermore, the mixers 130 and 140 are respective examples of a first mixer and a second mixer. The mixers 130 and 140 are provided for an IF signal at two stages.

The input terminal 101 is connected to the output terminal 51 of the data output unit 50 outside of the transmission device 100, and an IF signal is input from the data output unit 50. The input terminal 101 is connected to one input terminal of the mixer 130 in the transmission device 100.

The output terminal 102 is connected to an output terminal of the HPF 150 in the transmission device 100 and is connected to an antenna 103 outside the transmission device 100. The output terminal 102 is a terminal that outputs a transmission signal radio frequency (RF) obtained by performing frequency conversion and amplification on the IF signal by the transmission device 100. The transmission signal RF is transmitted from the antenna 103. Note that, for example, a circuit that performs impedance matching or other processing may also be provided between the output terminal 102 and the antenna 103.

The signal source 110 outputs a local signal (LO). A frequency of the local signal is, for example, 150 GHz. The frequency of the local signal is an example of a first frequency. Although 150 GHz is close to an upper limit of a frequency of a signal that can be amplified by the amplifiers 121 and 122 that are achieved by High Electron Mobility Transistors (HEMT), 150 GHz is a frequency at which the HEMT can be operated as the amplifiers 121 and 122 with excellent amplification characteristics. The output terminal of the signal source 110 is connected to input terminals of the amplifiers 121 and 122. As such a signal source 110, as an example, a Phase Locked Loop (PLL) synthesizer can be used.

The amplifier 121 includes the input terminal connected to the signal source 110 and an output terminal connected to another input terminal of the mixer 130, and amplifies the local signal input from the signal source 110 and outputs the amplified signal to the mixer 130. The amplifier 121 is achieved by a HEMT as an example.

The amplifier 122 includes the input terminal connected to the signal source 110 and an output terminal connected to one input terminal of the mixer 140, and amplifies the local signal input from the signal source 110 and outputs the amplified signal to the mixer 140. Note that the amplifier 122 can be achieved by a HEMT as an example, similarly to the amplifier 121. An amplification factor (gain) of the amplifier 122 may also be equal to or different from an amplification factor of the amplifier 121.

Furthermore, here, a mode will be described in which the local signals amplified by the two amplifiers 121 and 122 are input to the mixers 130 and 140. However, the number of amplifiers may also be one. After amplifying the local signal output from the signal source 110 by a single amplifier, the local signal may also be branched and input to the mixers 130 and 140.

The mixer 130 includes two input terminals connected to the input terminal 101 and the output terminal of the amplifier 121, and an output terminal connected to another input terminal of the mixer 140. The mixer 130 mixes the IF signal input from the input terminal 101 and the local signal amplified by the amplifier 121 and outputs the mixed signal to the mixer 140 as an output signal RF1. The output signal RF1 is an example of a first output signal. Therefore, when a frequency of the local signal is set as LO and a frequency of the IF signal is set as IF, a frequency of the output signal RF1 is set as LO±IF. The frequency LO±IF is a band including 150 GHz. Note that the mixer 130 is achieved by a HEMT as an example.

The mixer 140 includes two input terminals connected to the output terminal of the mixer 130 and the output terminal of the amplifier 122 and an output terminal connected to the input terminal of the HPF 150. The mixer 140 mixes the output signal RF1 input from the mixer 130 and the local signal amplified by the amplifier 122 and outputs the mixed signal to the HPF 150 as an output signal RF2. The output signal RF2 is an example of a second output signal. Therefore, a frequency of the output signal RF2 is set as 2×LO±IF. The frequency 2×LO±IF is a band including 300 GHz. The band including 300 GHz is an example of a band including a second frequency that is twice of the first frequency. Note that the mixer 140 is achieved by a HEMT as an example.

In this way, by mixing the local signals to the IF signal twice by the two-stage mixers 130 and 140, it is possible to obtain the output signal RF2 with the frequency that is twice of the local signal output from the signal source 110. Because output sources of the local signals that are mixed to the IF signal twice are the same signal source 110 and the local signals having the same frequency are mixed twice, generation of an extra frequency component is prevented, and the output signal RF2 in the band of 300 GHz that is twice of the original local signal is obtained. If the signal sources of the local signals that are mixed twice are different, there is a possibility that the output signal RF2 includes an extra frequency component due to an error between the frequencies of the local signals output from the two signal sources 110 or the like. However, by synthesizing the local signals output from the single signal source 110 twice, the output signal RF2 having a twice frequency at high accuracy can be obtained.

The HPF 150 includes the input terminal connected to the output terminal of the mixer 140 and the output terminal connected to the output terminal 102. The HPF 150 has a cutoff frequency that can pass through the frequency 2×LO±IF (band of 300 GHz) of the output signal RF2. The cutoff frequency is a frequency that is slightly lower than 2×LO−IF. By using such a HPF 150, a component in a band of 150 GHz that may be included in the output signal RF2 and other extra frequency component are removed, and it is possible to efficiently extract the component in the frequency band (band of 300 GHz) of 2×LO±IF.

Figure 2:
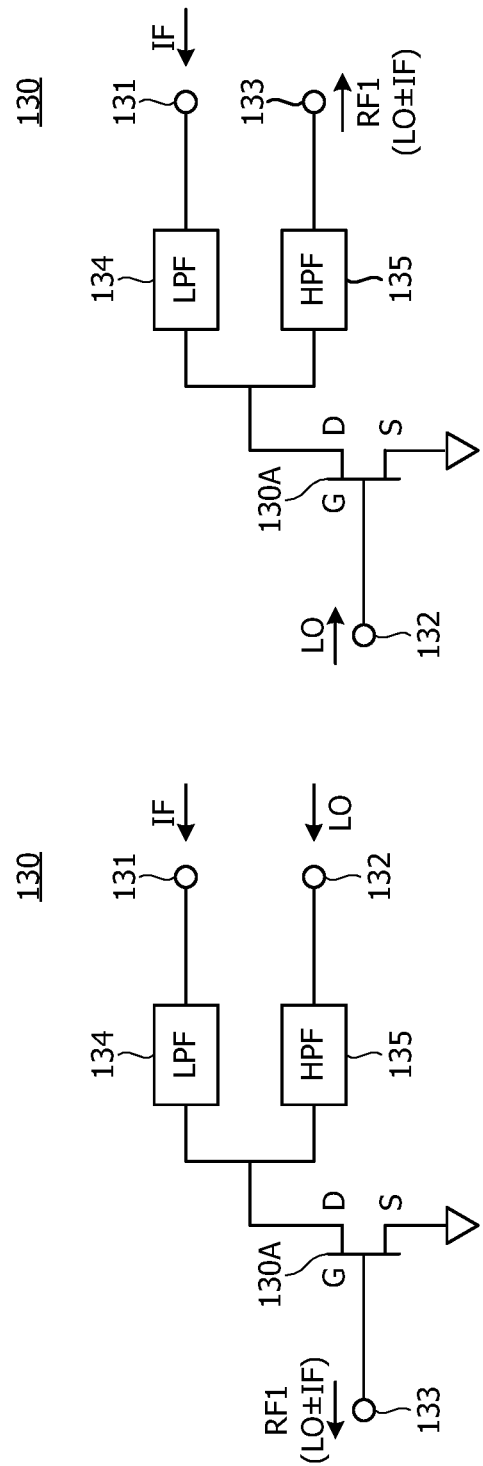
FIGS. 2A and 2B are diagrams illustrating an example of a circuit configuration of a mixer 130.

FIGS. 2A and 2B are diagrams illustrating an example of a circuit configuration of the mixer 130. Because the mixers 130 and 140 have the same circuit configuration, the mixer 130 will be described here. As an example, as illustrated in FIG. 2A, the mixer 130 includes a HEMT 130A, two input terminals 131 and 132, a single output terminal 133, a Low Pass Filter (LPF) 134, and a HPF 135.

A drain D of the HEMT is connected to the input terminal 131 via the LPF 134 and is connected to the input terminal 132 via the HPF 135. A gate G of the HEMT 130A is connected to the output terminal 133, and a source S of the HEMT 130A is grounded. The mixer 130 having a connection structure of such a HEMT 130A constructs a drain local injection mixer.

The input terminal 131 is connected to the input terminal 101 (refer to FIG. 1), and the IF signal is input, and the input terminal 132 is connected to the output terminal of the amplifier 121 (refer to FIG. 1), and the local signal (LO) amplified by the amplifier 121 is input. The output terminal 133 is connected to another input terminal of the mixer 140. In the HEMT 130A illustrated in FIG. 2A, the IF signal and the local signal are input to the drain D, and the output signal RF1 is output from the gate G. The frequency of the output signal RF1 is LO±IF. Such a drain local injection mixer may also be used as the mixers 130 and 140.

Furthermore, instead of the mixer 130 illustrated in FIG. 2A, the mixer 130 illustrated in FIG. 2B may also be used. The mixer 130 illustrated in FIG. 2B has a configuration in which the input terminal 132 and the output terminal 133 illustrated in FIG. 2A are replaced. The HEMT 130A illustrated in FIG. 2B constructs a resistive mixer. Note that, as in the HEMT 130A in FIG. 2A, the input terminal 131, the input terminal 132, and the output terminal 133 are connected to the input terminal 101, the output terminal of the amplifier 121 (refer to FIG. 1), and the another input terminal of the mixer 140, respectively.

In the HEMT 130A illustrated in FIG. 2B, the IF signal is input to the drain D, and the local signal is input to the gate G, and the output signal RF1 is output from the drain D. The frequency of the output signal RF1 is LO±IF. Such a resistive mixer may also be used as the mixers 130 and 140.

Figure 3:
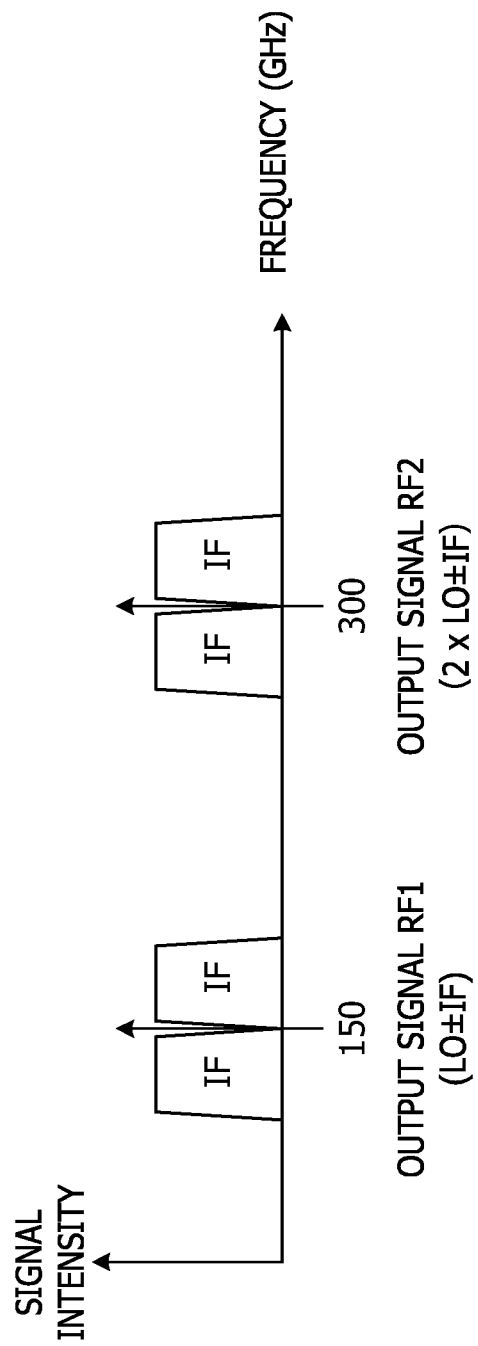
FIG. 3 is a diagram illustrating output signals RF1 and RF2 of the mixer 130 and a mixer 140.

FIG. 3 is a diagram illustrating the output signals RF1 and RF2 of the mixers 130 and 140. In FIG. 3, the horizontal axis indicates a frequency, and the vertical axis indicates a signal intensity. Although the output signals RF1 and RF2 include a component of 10 GHz of the IF signal, the component is omitted here.

As illustrated in FIG. 3, the output signal RF1 (LO±IF) of the mixer 130 is generated around 150 GHz, and the output signal RF2 (2×LO±IF) of the mixer 140 is generated around 300 GHz. In this way, by mixing the local signals having the same frequency into the IF signal twice by the mixers 130 and 140 at two stages, the output signal RF2 in the band of 300 GHz can be obtained. By passing through the HPF 150, the extra frequency component of the output signal RF2 is removed, and the output signal RF2 is output from the output terminal 102 as the transmission signal RF in the band of 300 GHz.

As described above, by mixing the two local signals having the same frequency output from the same signal source 110 into the IF signal respectively by the mixers 130 and 140 at two stages, the output signal RF2 in the band of 300 GHz can be obtained using the local signal of 150 GHz. Because the local signals that are output from the same signal source 110 and are respectively amplified by the amplifiers 121 and 122 are supplied to the mixers 130 and 140, the frequencies of the two local signals supplied to the mixers 130 and 140 are 150 GHz and are completely equal to each other. Therefore, it is possible to accurately generate the output signal RF2 in the band of 300 GHz using the local signal of 150 GHz that is equal to or less than the upper limit frequency that can be amplified by the amplifiers 121 and 122 achieved by the HEMT. Then, the HPF 150 can remove the extra frequency component included in the output signal RF2, and the output signal RF2 can be output from the output terminal 102 as the transmission signal RF.

Therefore, it is possible to provide the transmission device 100 and the electronic device 10 that can output the transmission signal RF in the frequency band exceeding the upper limit frequency of the semiconductor device.

Furthermore, in order to obtain the output signal RF2 by the mixer 140, the two local signals of 150 GHz that are output from the same signal source 110, are respectively amplified by the amplifiers 121 and 122, and have the frequencies that are completely equal to each other are supplied to the mixers 130 and 140. Therefore, it is possible to prevent the generation of the extra frequency component and obtain the output signal RF2 of 300 GHz and the transmission signal RF with high accuracy and less errors.

The band of 300 GHz is a promising frequency band for sixth generation (6G) that is next generation communication. However, it is difficult to achieve a semiconductor circuit that operates at a high frequency such as 300 GHz. Even if a transistor with high electron mobility as a HEMT is used, the upper limit of the frequency of the signal that can be amplified by the amplifiers 121 and 122 with excellent amplification characteristics is substantially slightly higher than 150 GHz.

Therefore, for example, it is difficult for a single mixer to synthesize the IF signal and the local signal of 300 GHz. This is because it is not realistic to achieve an amplifier that can amplify the local signal of 300 GHz.

Furthermore, for example, a circuit is considered that outputs a transmission signal of 300 GHz by amplifying a local signal of 100 GHz or 150 GHz by an amplifier achieved by the HEMT, mixing the IF signal and the local signal amplified by the amplifier by the single mixer, and multiplying the frequency of the output signal obtained by mixing by three or two by a multiplier. However, in this case, because the band of the IF signal is extended by three or two times (3×IF or 2×IF), it is not possible to obtain the output signal RF2 of which the frequency is 2×LO±IF as in the first embodiment described above. The component of the IF signal becomes ±3 IF or ±2 IF. Furthermore, there is a problem in that the multiplier has a large conversion loss. As an example, while a conversion loss of each of the mixers 130 and 140 is −10 dB, the conversion loss of the multiplier is −20 dB.

From such a viewpoint, it can be said that the transmission device 100 that supplies the two local signals of 150 GHz that are output from the same signal source 110, are respectively amplified by the amplifiers 121 and 122, and have the frequencies that are completely equal to each other to the mixers 130 and 140 achieves very efficient frequency conversion and amplification. Furthermore, with such a configuration, the output signal RF2 of 300 GHz and the transmission signal RF with high accuracy and with less errors can be obtained.

Furthermore, because the HPF 150 provided on the output side of the mixer 140 is included, a component in the band of 150 GHz that may be included in the output signal RF2 can be efficiently and easily removed, and the transmission signal RF in the band of 300 GHz with high quality can be output.

Figure 4:
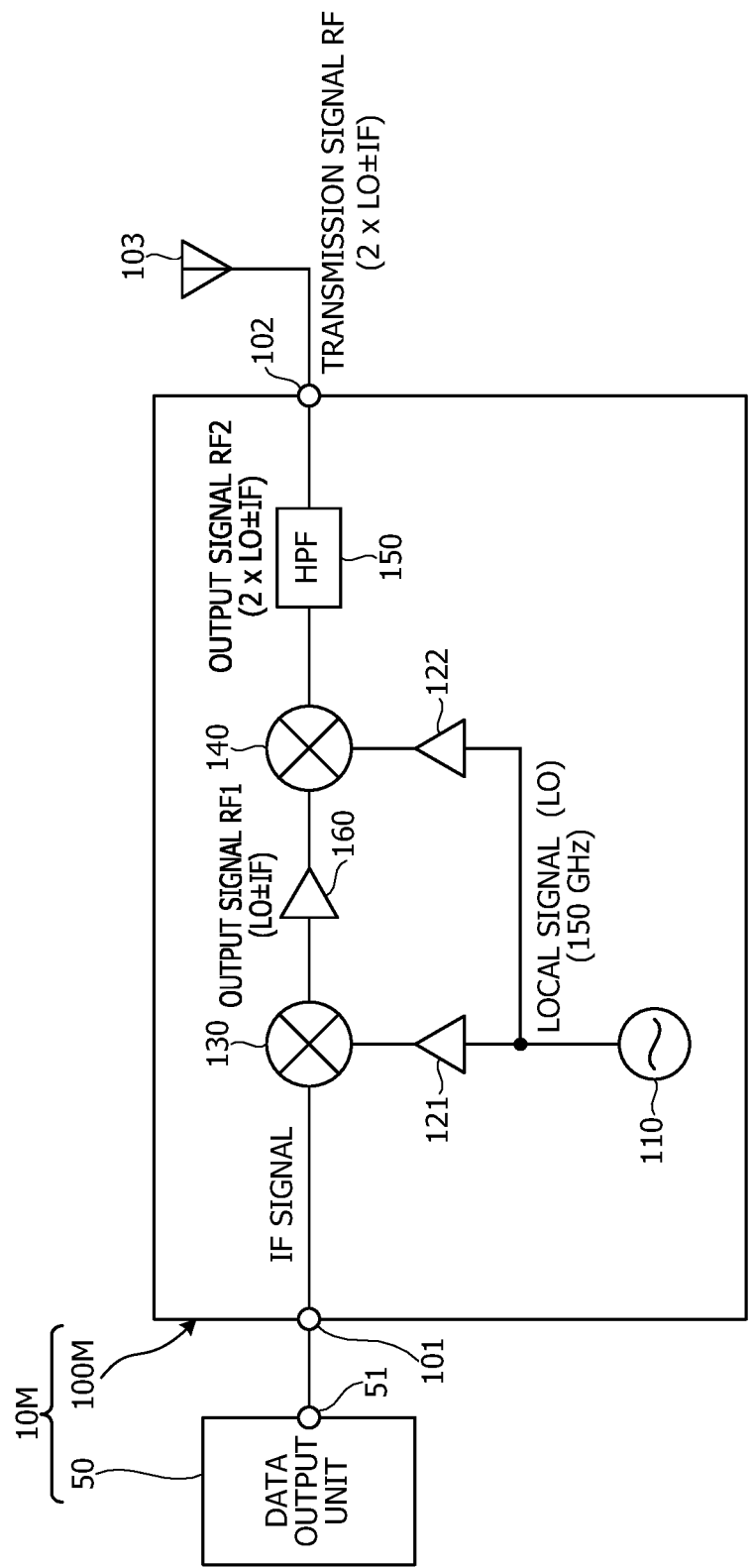
FIG. 4 is a diagram illustrating a configuration of an electronic device 10M including a transmission device 100M according to a modification of the first embodiment.

FIG. 4 is a diagram illustrating a configuration of an electronic device 10M including a transmission device 100M according to a modification of the first embodiment. The electronic device 10M includes the data output unit 50 and the transmission device 100M. Similarly to the electronic device 10, the electronic device 10M is, for example, a smartphone, a tablet computer, other mobile devices having communication functions, or the like.

The transmission device 100M is different from the transmission device 100 according to the first embodiment in that an amplifier 160 is added between the mixers 130 and 140. Because other components are similar to those of the transmission device 100 according to the first embodiment, differences will be described here.

The amplifier 160 is an example of a second amplifier. The amplifier 160 includes an input terminal connected to the output terminal of the mixer 130 and an output terminal connected to the input terminal of the mixer 140. The amplifier 160 is achieved by a HEMT as an example similarly to the amplifiers 121 and 122. The amplifier 160 further amplifies the output signal RF1 output from the mixer 130 and outputs the output signal RF1 to the mixer 140. After synthesis by the mixer 140, a procedure is similar to that of the transmission device 100 according to the first embodiment.

Therefore, it is possible to provide the transmission device 100M and the electronic device 10M that can output the transmission signal RF in the frequency band exceeding the upper limit frequency of the semiconductor device. Furthermore, because the transmission device 100M includes the amplifier 160 between the mixers 130 and 140, it is possible to further increase an output of the transmission signal RF. Note that it is sufficient to set an amplification factor of the amplifier 160 to an appropriate value according to an application or the like of the transmission device 100M.

Second Embodiment

Figure 5:
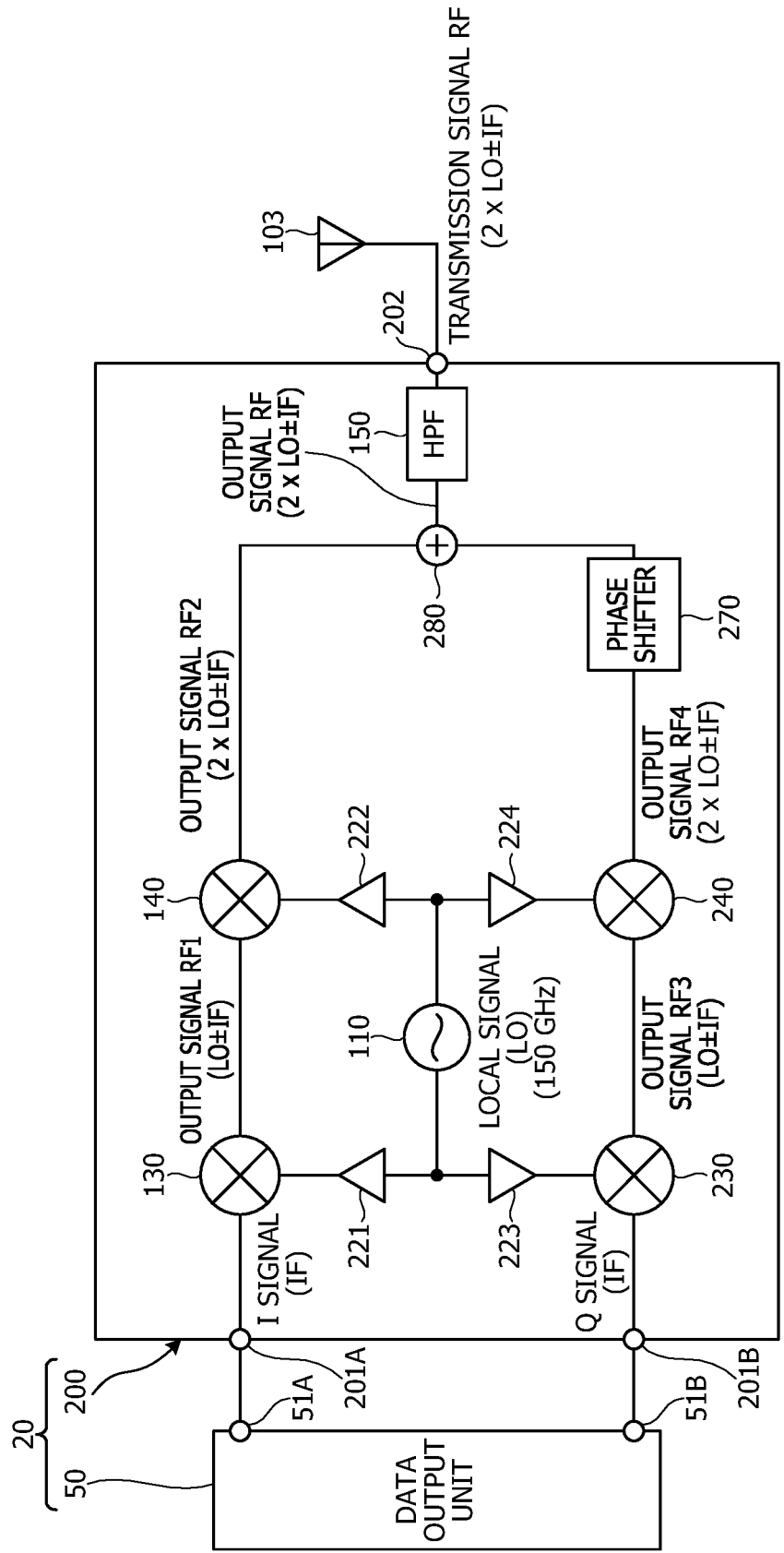
FIG. 5 is a diagram illustrating a configuration of an electronic device 20 including a transmission device 200 according to a second embodiment.

FIG. 5 is a diagram illustrating a configuration of an electronic device 20 including a transmission device 200 according to a second embodiment. The electronic device 20 includes a data output unit 50 and the transmission device 200. Similarly to the electronic device 10, the electronic device 20 is, for example, a smartphone, a tablet computer, other mobile devices having communication functions, or the like.

In the second embodiment, the data output unit 50 includes two output terminals 51A and 51B and outputs an I signal and a Q signal respectively from the output terminals 51A and 51B. The I signal is a real number component of an IF signal, and the Q signal is an imaginary number component of the IF signal. A phase of the Q signal is delayed by 90 degrees with respect to the I signal. The I signal is an example of a first input signal, and the Q signal is an example of a second input signal having a phase different from that of the first input signal by 90 degrees and an intermediate frequency.

The transmission device 200 includes input terminals 201A and 201B, an output terminal 202, a signal source 110, amplifiers 221 to 224, mixers 130, 140, 230, and 240, a HPF 150, a phase shifter 270, and an adder 280. The mixers 130, 140, 230, and 240 are provided for the I signal and the Q signal in two systems and at two stages. Here, a component similar to that in the transmission device 100 according to the first embodiment is denoted with the same reference numeral, and the description thereof will be omitted.

The amplifiers 221 to 224 are examples of a first amplifier. Here, a mode will be described in which the first amplifier includes the four amplifiers 221 to 224. The mixers 130, 140, 230, and 240 are respective examples of a first mixer, a second mixer, a third mixer, and a fourth mixer.

The input terminal 201A is connected to the output terminal 51A of the data output unit 50 outside the transmission device 200, and the I signal is input from the data output unit 50. The input terminal 201A is connected to one input terminal of the mixer 130 in the transmission device 200.

The input terminal 201B is connected to the output terminal 51B of the data output unit 50 outside the transmission device 200, and the Q signal is input from the data output unit 50. The input terminal 201B is connected to one input terminal of the mixer 230 in the transmission device 200.

The output terminal 202 is connected to an output terminal of the HPF 150 in the transmission device 200 and is connected to an antenna 103 outside the transmission device 200. The output terminal 202 is a terminal that outputs a transmission signal RF obtained by performing frequency conversion and amplification on the IF signal by the transmission device 200. Note that, for example, a circuit that performs impedance matching or other processing may also be provided between the output terminal 202 and the antenna 103.

The signal source 110 outputs a local signal (LO). A frequency of the local signal is, for example, 150 GHz. Although 150 GHz is close to an upper limit frequency of a signal that can be amplified by the amplifiers 221 to 224 that is achieved by a HEMT, 150 GHz is a frequency at which the HEMT can operate as the amplifiers 221 to 224 with excellent amplification characteristics. An output terminal of the signal source 110 is connected to input terminals of the amplifiers 221 to 224.

The amplifier 221 is similar to the amplifier 121 according to the first embodiment, includes the input terminal connected to the signal source 110 and an output terminal connected to another input terminal of the mixer 130, and amplifies the local signal input from the signal source 110 and outputs the local signal to the mixer 130. The amplifier 221 is achieved by a HEMT.

The amplifier 222 is similar to the amplifier 122 according to the first embodiment, includes the input terminal connected to the signal source 110 and an output terminal connected to one input terminal of the mixer 140, and amplifies the local signal input from the signal source 110 and outputs the local signal to the mixer 140. Note that the amplifier 222 can be achieved by a HEMT similarly to the amplifier 221. An amplification factor of the amplifier 222 may also be equal to or different from an amplification factor of the amplifier 221.

The amplifier 223 includes the input terminal connected to the signal source 110 and an output terminal connected to another input terminal of the mixer 230, and amplifies the local signal input from the signal source 110 and outputs the local signal to the mixer 230. The amplifier 223 is achieved by a HEMT. It is preferable to set an amplification factor of the amplifier 223 to be the same value as the amplification factor of the amplifier 221 in consideration of symmetry of a circuit.

The amplifier 224 includes the input terminal connected to the signal source 110 and an output terminal connected to one input terminal of the mixer 240, and amplifies the local signal input from the signal source 110 and outputs the amplified signal to the mixer 240. Note that it is preferable to set an amplification factor of the amplifier 224 to be the same value as the amplification factor of the amplifier 221 in consideration of symmetry of the circuit.

Furthermore, here, a mode will be described in which the local signals amplified by the four amplifiers 221 to 224 are input to the mixers 130, 140, 230, and 240. However, the number of amplifiers may also be one. After amplifying the local signal output from the signal source 110 by a single amplifier, the local signal may also be branched and input to the mixers 130, 140, 230, and 240.

The mixer 130 includes two input terminals connected to the input terminal 201A and the output terminal of the amplifier 221, and an output terminal connected to another input terminal of the mixer 140. The mixer 130 mixes the I signal input from the input terminal 201A and the local signal amplified by the amplifier 221 and outputs the mixed signal to the mixer 140 as an output signal RF1. The output signal RF1 is an example of a first output signal. Therefore, a frequency of the output signal RF1 is set as LO±IF. The frequency LO±IF is a band including 150 GHz. Note that a frequency of the I signal is IF.

The mixer 140 includes two input terminals connected to the output terminal of the mixer 130 and the output terminal of the amplifier 222 and an output terminal connected to one input terminal of the adder 280. The mixer 140 mixes the output signal RF1 input from the mixer 130 and the local signal amplified by the amplifier 222 and outputs the mixed signal to the adder 280 as an output signal RF2. The output signal RF2 is an example of a second output signal. Therefore, a frequency of the output signal RF2 is set as 2×LO±IF. The frequency 2×LO±IF is a band including 300 GHz.

The mixer 230 includes two input terminals connected to the input terminal 201B and the output terminal of the amplifier 223, and an output terminal connected to another input terminal of the mixer 240. The mixer 230 mixes the Q signal input from the input terminal 201B and the local signal amplified by the amplifier 223 and outputs the mixed signal to the mixer 140 as an output signal RF3. The output signal RF3 is an example of a third output signal. Therefore, a frequency of the output signal RF3 is set as LO±IF. The frequency LO±IF is a band including 150 GHz. Note that a frequency of the Q signal is IF.

The mixer 240 includes two input terminals connected to the output terminal of the mixer 230 and the output terminal of the amplifier 224 and an output terminal connected to an input terminal of the phase shifter 270. The mixer 240 mixes the output signal RF3 input from the mixer 230 and the local signal amplified by the amplifier 224 and outputs the mixed signal to the phase shifter 270 as an output signal RF4. The output signal RF4 is an example of a fourth output signal. Therefore, a frequency of the output signal RF4 is set as 2×LO±IF. The frequency 2×LO±IF is a band including 300 GHz.

The phase shifter 270 includes an input terminal connected to the output terminal of the mixer 240 and an output terminal connected to another input terminal of the adder 280 and advances the phase of the output signal RF4 input from the mixer 240 by 90 degrees and outputs the output signal RF4. Therefore, a phase of the output signal RF4 of which the phase is shifted by the phase shifter 270 and is output is equal to the phase of the output signal RF2. In this way, the phase shifter 270 aligns the phases of the output signal RF4 and the output signal RF2. Note that, as such a phase shifter 270, as an example, a transmission line having a length of ¼ of the wavelength at the frequency of the output signal RF4 can be used. It is sufficient to advance a phase by 90 degrees by such a transmission line.

The adder 280 includes two input terminals connected to the output terminal of the mixer 140 and the output terminal of the phase shifter 270 and an output terminal connected to the input terminal of the HPF 150. The adder 280 adds the output signal RF2 input from the mixer 140 and the output signal RF4 that is input after advancing its phase by 90 degrees by the phase shifter 270.

Here, an angular velocity of the IF signal is set as $\omega_{IF}$, and an angular velocity of the local signal is set as $\omega_{LO}$. A frequency obtained by the angular velocity $\omega_{LO}$ is 150 GHz. When it is assumed that the I signal be cos $(\omega_{IF} \cdot t)$ and the Q signal be sin $(\omega_{IF} \cdot t)$, the output signal RF1 is cos $(\omega_{LO}+\omega_{IF})$ t+cos $(\omega_{LO}-\omega_{IF})$ t, and the output signal RF2 is cos $(2\omega_{LO}+\omega_{IF})$ t+cos $(2\omega_{LO}-\omega_{IF})$ t+cos $(2\omega_{IF})$ t. Because the frequency of cos $(2\omega_{IF})$ t of the output signal RF2 is lower than cos $(2\omega_{LO}+\omega_{IF})$ t+cos $(2\omega_{LO}-\omega_{IF})$ t, the frequency of cos $(2\omega_{IF})$ t is ignored.

Furthermore, the output signal RF3 is sin $(\omega_{LO}+\omega_{IF})$ t−sin $(\omega_{LO}-\omega_{IF})$ t, and the output signal RF4 is sin $(2\omega_{LO}+\omega_{IF})$ t−sin $(2\omega_{LO}-\omega_{IF})$ t+sin $(2\omega_{IF})$ t. Because the frequency of sin $(2\omega_{IF})$ t of the output signal RF4 is lower than sin $(2\omega_{LO}+\omega_{IF})$ t−sin $(2\omega_{LO}-\omega_{IF})$ t, the frequency of sin $(2\omega_{IF})$ t is ignored.

Because the phase shifter 270 advances the phase of the output signal RF4 output from the mixer 240 by 90 degrees, the output signal RF4 output from the phase shifter 270 is cos $(2\omega_{LO}+\omega_{IF})$ t−cos $(2\omega_{LO}-\omega_{IF})$ t.

Therefore, an output of the adder 280 is 2 cos $(2\omega_{LO}+\omega_{IF})$ t obtained by adding the output signal RF2 cos $(2\omega_{LO}+\omega_{IF})$ t+cos $(2\omega_{LO}-\omega_{IF})$ t and the output cos $(2\omega_{LO}+\omega_{IF})$ t−cos $(2\omega_{LO}-\omega_{IF})$ t of the phase shifter 270. Because a frequency obtained by the angular velocity $\omega_{LO}$ is 150 GHz, a frequency of the output of the adder 280 is a band of 300 GHz. In other words, for example, a frequency of the output signal RF output from the adder 280 is 2×LO+IF that is a band obtained by adding the frequencies IF of the I signal and the Q signal to 300 GHz.

The HPF 150 includes the input terminal connected to the output terminal of the adder 280 and the output terminal connected to the output terminal 202 in the second embodiment. The HPF 150 outputs a component in the band of 300 GHz of the output of the adder 280 as a transmission signal RF (2×LO+IF).

Figure 6:
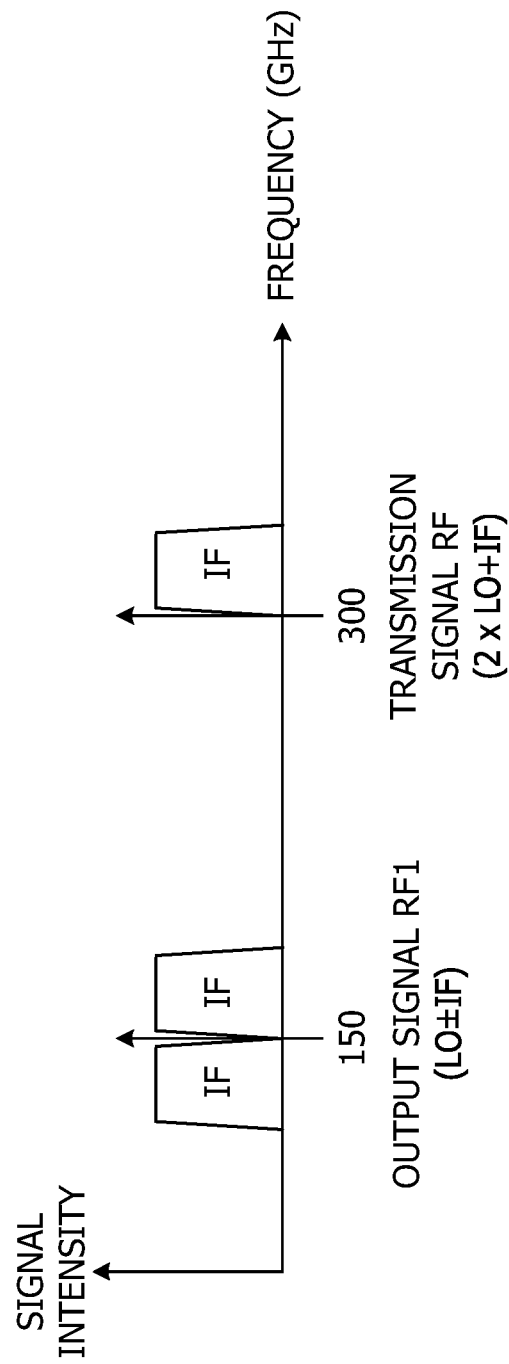
FIG. 6 is a diagram illustrating the output signal RF1 of the mixer 130 and a transmission signal RF output from a HPF 150.

FIG. 6 is a diagram illustrating the output signal RF1 of the mixer 130 and the transmission signal RF output from the HPF 150. In FIG. 6, the horizontal axis indicates a frequency, and the vertical axis indicates a signal intensity. Although the output signal RF1 includes a component of 10 GHz of the IF signal, the component is omitted here.

As illustrated in FIG. 6, in a band of 150 GHz, a band of +IF and a band of −IF that are the output signal RF1 (LO±IF) of the mixer 130 are generated, and in a band of 300 GHz, only the band of +IF that is the transmission signal RF (2×LO+IF) is generated, and the band of −IF is not generated. In this way, by mixing local signals having the same frequency twice by the mixers 130 and 230 and the mixers 140 and 240 in two systems and at two stages into the I signal and the Q signal, the transmission signal RF in the band of 300 GHz can be obtained.

As described above, by mixing the four local signals having the same frequency output from the same signal source 110 into the I signal and the Q signal by the mixers 130 and 140 and the mixers 230 and 240 in two systems and at two stages, the output signals RF2 and RF4 in the band of 300 GHz can be obtained using the local signal of 150 GHz. Because the local signals that are output from the same signal source 110 and amplified by the amplifiers 221 to 224 are respectively supplied to the mixers 130, 140, 230, and 240, the frequencies of the four local signals supplied to the mixers 130, 140, 230, and 240 are 150 GHz and are completely equal to one another. Therefore, it is possible to accurately generate the output signals RF2 and RF4 in the band of 300 GHz using the local signal of 150 GHz that is equal to or less than the upper limit frequency that can be amplified by the amplifiers 221 to 224 achieved by a HEMT. Then, after the output signal RF2 and the output signal RF4 of which the phase has been advanced by the phase shifter 270 by 90 degrees in accordance with the output signal RF2 by the adder 280, it is possible to remove an extra frequency component by the HPF 150 and output the signal as the transmission signal RF from the output terminal 202.

Therefore, it is possible to provide the transmission device 200 and the electronic device 20 that can output the transmission signal RF in the frequency band exceeding an upper limit frequency of a semiconductor device.

Furthermore, in order to obtain the output signal RF2 by the mixer 140, the two local signals of 150 GHz that are output from the same signal source 110, are respectively amplified by the amplifiers 221 and 222, and have the frequencies that are completely equal to each other are supplied to the mixers 130 and 140. Similarly, in order to obtain the output signal RF4 by the mixer 240, the two local signals of 150 GHz that are output from the same signal source 110, are respectively amplified by the amplifiers 223 and 224, and have the frequencies that are completely equal to each other are supplied to the mixers 230 and 240. Therefore, it is possible to prevent the generation of the extra frequency component and obtain the output signals RF2 and RF4 of 300 GHz with high accuracy and less errors.

Furthermore, in addition, because the output signal RF4 output from the mixer 240 is added by the adder 280 after advancing the phase of the output signal RF4 by 90 degrees by the phase shifter 270 in accordance with the output signal RF2, it is possible to obtain an output signal RF (2×LO+IF) in which the band of −IF is cancelled and only the band of +IF is selectively left. Therefore, the output signal RF (2×LO−IF) in which only the band of +IF is selectively left can be output. In other words, for example, the frequency of the output signal RF that is finally output can be set to 2×LO+IF.

Moreover, the HPF 150 can remove the extra frequency component included in the output signal RF (2×LO+IF) output from the adder 280 and can output the signal from the output terminal 202 as the transmission signal RF. Because a frequency of the transmission signal RF is 2×LO+IF, includes the band of +IF, and does not include the band of −IF, a frequency band of the transmission signal RF that is finally output can be selectively set to the band of +IF at 300 GHz.

The band of 300 GHz is a promising frequency band for 6G that is next generation communication. However, it is difficult to achieve a semiconductor circuit that operates at a high frequency such as 300 GHz. Even if a transistor with high electron mobility as a HEMT is used, the upper limit of the signal that can be amplified by the amplifiers 221 to 224 with excellent amplification characteristics is about 150 GHz.

As described in the first embodiment, for example, it is difficult for a single mixer to synthesize the IF signal and the local signal of 300 GHz. Furthermore, when the multiplier is used, because the band of the IF signal is extended by three or two times (3×IF or 2×IF), it is not possible to obtain the output signals RF2 and RF4 of which the frequency is 2×LO±IF as in the second embodiment described above.

From such a viewpoint, it can be said that the transmission device 200 that supplies the four local signals of 150 GHz that are output from the same signal source 110, are amplified by the amplifiers 221 to 224, and have the frequencies that are completely equal to one another to the mixers 130 and 140 and the mixers 230 and 240 achieves very efficient frequency conversion and amplification. Furthermore, with such a configuration, the output signals RF2, RF4, and RF and the transmission signal RF of 300 GHz with high accuracy and with less errors can be obtained.

Furthermore, because the HPF 150 provided on the output side of the adder 280 is included, a component in the band of 150 GHz that may be included in the output signal RF output from the adder 280 can be efficiently and easily removed, and the transmission signal RF in the band of 300 GHz with high quality can be output.

First Modification of Second Embodiment

Figure 7:
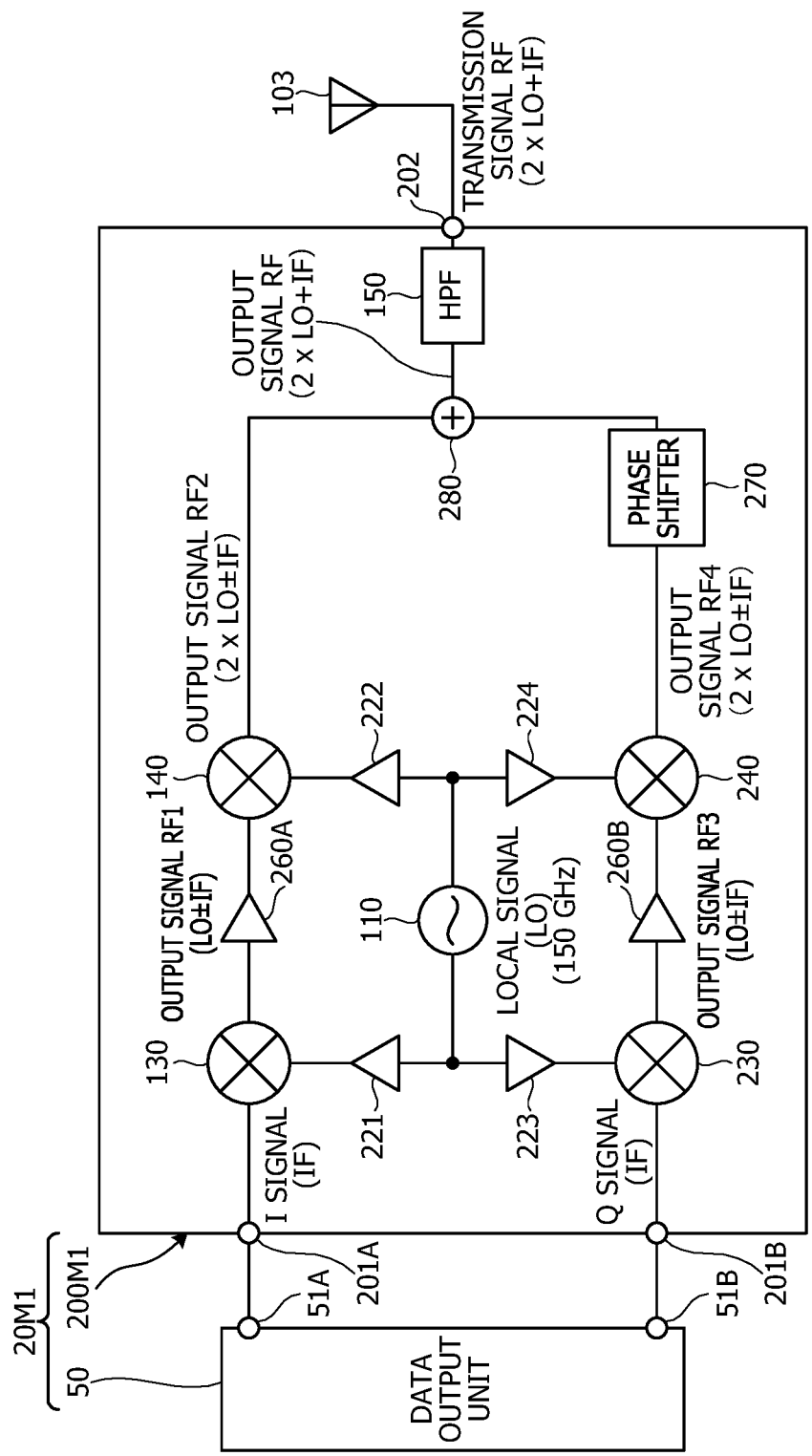
FIG. 7 is a diagram illustrating a configuration of an electronic device 20M1 including a transmission device 200M1 according to a first modification of the second embodiment.

FIG. 7 is a diagram illustrating a configuration of an electronic device 20M1 including a transmission device 200M1 according to a first modification of the second embodiment. The electronic device 20M1 includes the data output unit 50 and the transmission device 200M1. Similarly to the electronic device 20, the electronic device 20M1 is, for example, a smartphone, a tablet computer, other mobile devices having communication functions, or the like.

The transmission device 200M1 is different from the transmission device 200 according to the second embodiment in that an amplifier 260A is added between the mixers 130 and 140 and an amplifier 260B is added between the mixers 230 and 240. Because other components are similar to those of the transmission device 200 according to the second embodiment, differences will be described here.

The amplifier 260A is an example of a second amplifier, and the amplifier 260B is an example of a third amplifier. The amplifier 260A includes an input terminal connected to the output terminal of the mixer 130 and an output terminal connected to the input terminal of the mixer 140. The amplifier 260B includes an input terminal connected to the output terminal of the mixer 230 and an output terminal connected to the input terminal of the mixer 240.

The amplifiers 260A and 260B are achieved by HEMTs as an example similarly to the amplifiers 221 to 224. The amplifier 260A further amplifies the output signal RF1 output from the mixer 130 and outputs the signal to the mixer 140, and the amplifier 260B further amplifies the output signal RF3 output from the mixer 230 and outputs the signal to the mixer 240. After synthesis by the mixers 140 and 240, a procedure is similar to that of the transmission device 200 according to the second embodiment.

Therefore, it is possible to provide the transmission device 200M1 and the electronic device 20M1 that can output the transmission signal RF in a frequency band exceeding the upper limit frequency of the semiconductor device. Furthermore, because the transmission device 200M1 includes the amplifier 260A between the mixers 130 and 140 and the amplifier 260B between the mixers 230 and 240, the output of the transmission signal RF can be further increased. Note that it is sufficient to set amplification factors of the amplifiers 260A and 260B to be an appropriate value according to an application or the like of the transmission device 200M1.

Second Modification of Second Embodiment

Figure 8:
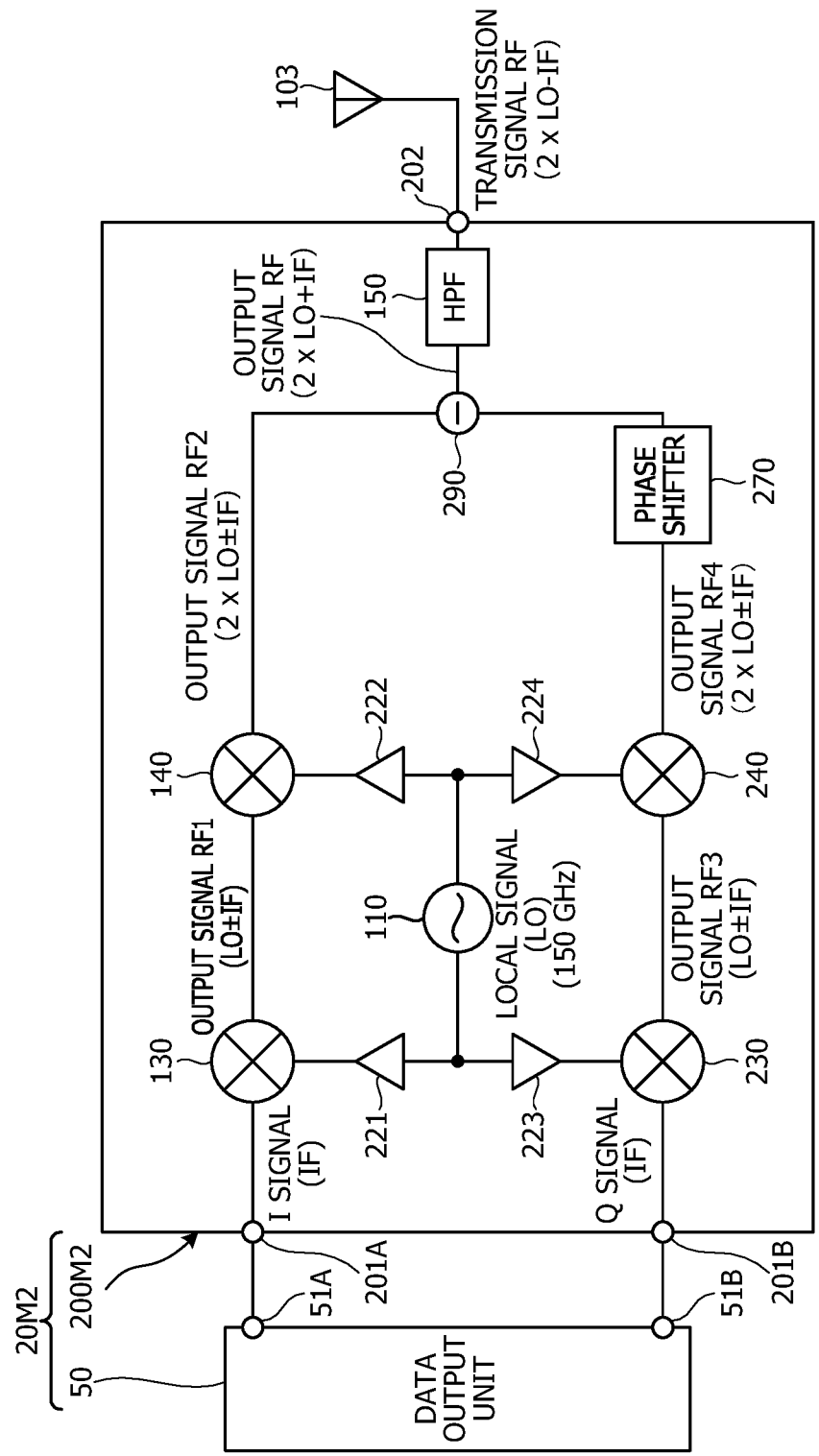
FIG. 8 is a diagram illustrating a configuration of an electronic device 20M2 including a transmission device 200M2 according to a second modification of the second embodiment.

FIG. 8 is a diagram illustrating a configuration of an electronic device 20M2 including a transmission device 200M2 according to a second modification of the second embodiment. The electronic device 20M2 includes the data output unit 50 and the transmission device 200M2. Similarly to the electronic device 20, the electronic device 20M2 is, for example, a smartphone, a tablet computer, other mobile devices having communication functions, or the like.

The transmission device 200M2 is different from the transmission device 200 according to the second embodiment in that a subtractor 290 is provided instead of the adder 280. Because other components are similar to those of the transmission device 200 according to the second embodiment, differences will be described here.

An output of the subtractor 290 is $2 \cos(2\omega_{LO}-\omega_{IF})t$ that is a difference between $\cos(2\omega_{LO}+\omega_{IF})t+\cos(2\omega_{LO}-\omega_{IF})t$ of the output signal RF2 and the output $\cos(2\omega_{LO}+\omega_{IF})t-\cos(2\omega_{LO}-\omega_{IF})t$ of the phase shifter 270. Because a frequency obtained by the angular velocity $\omega_{LO}$ is 150 GHz, a frequency of the output of the subtractor 290 is a band of 300 GHz. In other words, for example, the frequency of the output signal RF output from the subtractor 290 is 2×LO−IF that is a band obtained by subtracting the frequencies IF of the I signal and the Q signal from 300 GHz.

In the second modification of the second embodiment, the HPF 150 outputs a component in the band of 300 GHz of the output of the subtractor 290 as a transmission signal RF (2×LO−IF).

Figure 9:
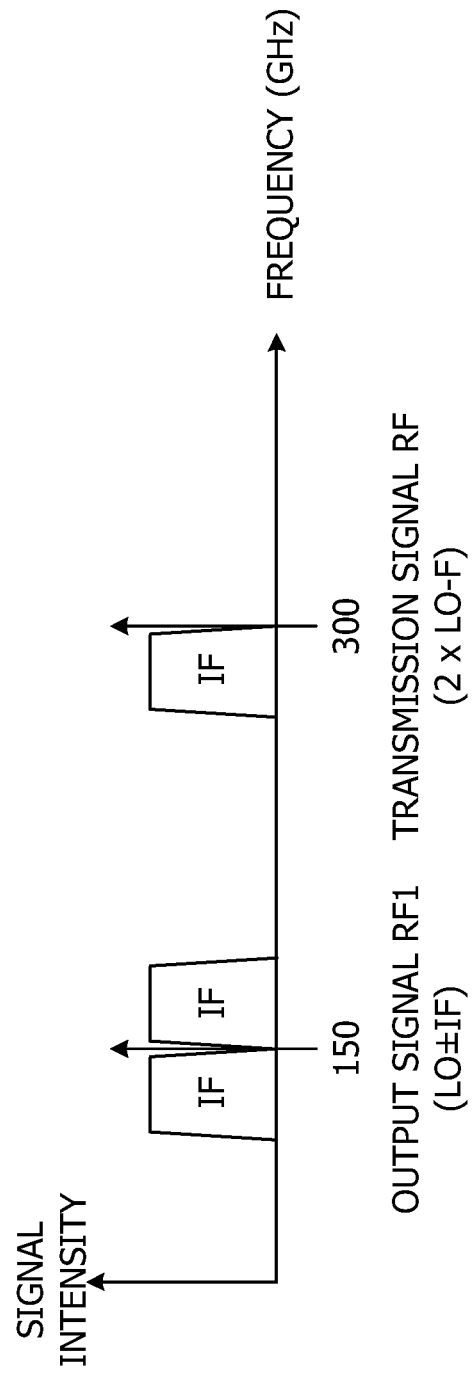
FIG. 9 is a diagram illustrating the output signal RF1 of the mixer 130 and the transmission signal RF output from the HPF 150.

FIG. 9 is a diagram illustrating the output signal RF1 of the mixer 130 and the transmission signal RF output from the HPF 150. In FIG. 9, the horizontal axis indicates a frequency, and the vertical axis indicates a signal intensity. Although the output signal RF1 includes a component of 10 GHz of the IF signal, the component is omitted here.

As illustrated in FIG. 9, the output signal RF1 (LO±IF) of the mixer 130 is generated around 150 GHz, and the transmission signal RF (2×LO−IF) is generated in a band lower than 300 GHz by the frequency of the IF signal. In this way, by mixing local signals having the same frequency twice by the mixers 130 and 230 and the mixers 140 and 240 in two systems and at two stages into the I signal and the Q signal, the transmission signal RF in the band of 300 GHz can be obtained.

Therefore, it is possible to provide the transmission device 200M2 and the electronic device 20M2 that can output the transmission signal RF in a frequency band exceeding the upper limit frequency of the semiconductor device.

Because a difference is obtained by the subtractor 290 after advancing the phase of the output signal RF4 output from the mixer 240 by the phase shifter 270 by 90 degrees and mixing the output signal RF4 to the output signal RF2, it is possible to obtain an output signal RF (2×LO−IF) in which the band of +IF is cancelled and only a band of −IF is selectively left. Therefore, the output signal RF (2×LO−IF) in which only −IF band is selectively left can be output. In other words, for example, the frequency of the output signal RF that is finally output can be set to 2×LO−IF.

Moreover, the HPF 150 can remove the extra frequency component included in the output signal RF (2×LO−IF) output from the subtractor 290 and can output the signal from the output terminal 202 as the transmission signal RF. Because a frequency of the transmission signal RF is 2×LO−F, includes a band of −IF, and does not include a band of +IF, a frequency band of the transmission signal RF that is finally output can be selectively set to the band of −IF at 300 GHz.

Simulation Result

Figure 10:
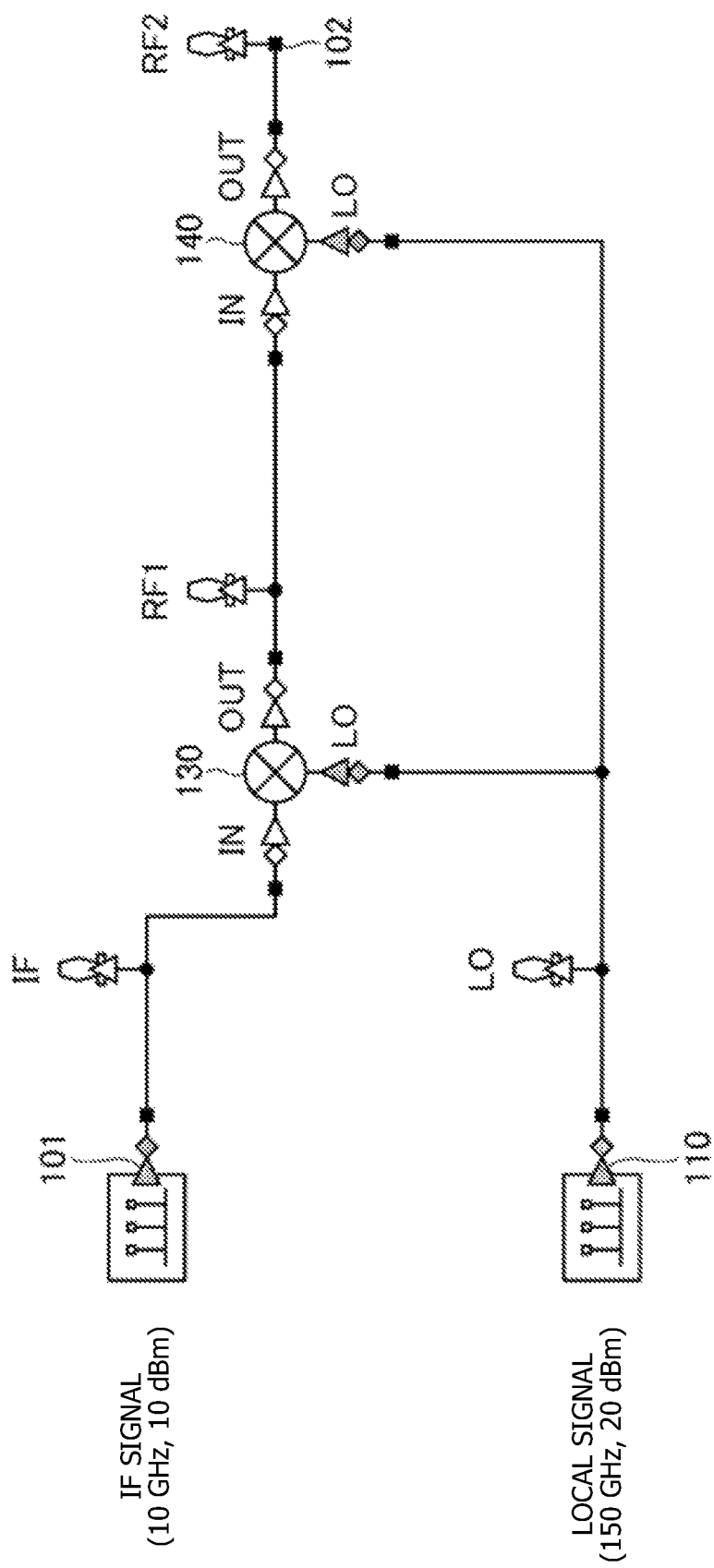
FIG. 10 is a diagram illustrating a simulation model of the transmission device 100 according to the first embodiment.

FIG. 10 is a diagram illustrating a simulation model of the transmission device 100 according to the first embodiment. The simulation model illustrated in FIG. 10 corresponds to the transmission device 100 illustrated in FIG. 1. In FIG. 10, the input terminal 101, the output terminal 102, the signal source 110, and the mixers 130 and 140 are illustrated, and the amplifiers 121 and 122 and the HPF 150 are omitted. A 10-GHz and 10-dBm signal has been input as the IF signal, and a 150-GHz and 20-dBm signal has been input as the local signal.

As a condition of the simulation, only a component (LO+IF, 2×LO+IF) of +IF has been obtained, and a component (LO−IF, 2×LO−IF) of −IF has not been obtained. Furthermore, an output of the local signal has been increased by the amplification factors of the amplifiers 121 and 122 instead of omitting the amplifiers 121 and 122. Furthermore, a conversion loss of the mixers 130 and 140 has been set to −20 dB.

Figure 11:
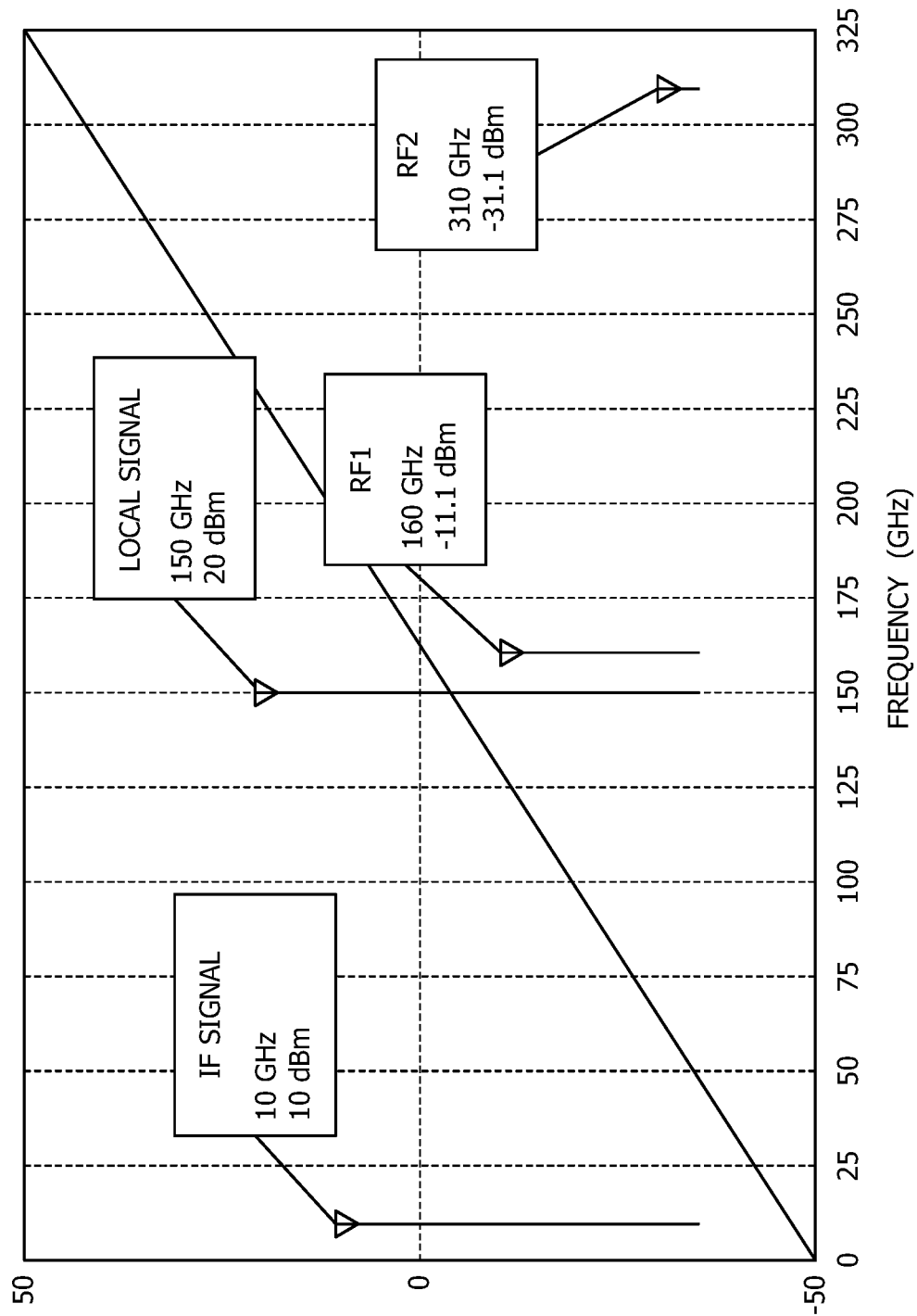
FIG. 11 is a diagram illustrating a simulation result regarding the transmission device 100 according to the first embodiment.

FIG. 11 is a diagram illustrating a simulation result regarding the transmission device 100 according to the first embodiment. When the IF signal (10 GHz, 10 dBm) and the local signal (150 GHz, 20 dBm) are input, the output signal RF1 has been 160 GHz and −11.1 dBm, and the output signal RF2 has been 310 GHz and −31.1 dBm. Although the output of the output signal RF2 has been low, it can be confirmed that the output signal RF2 of 310 GHz is obtained.

Figure 12:
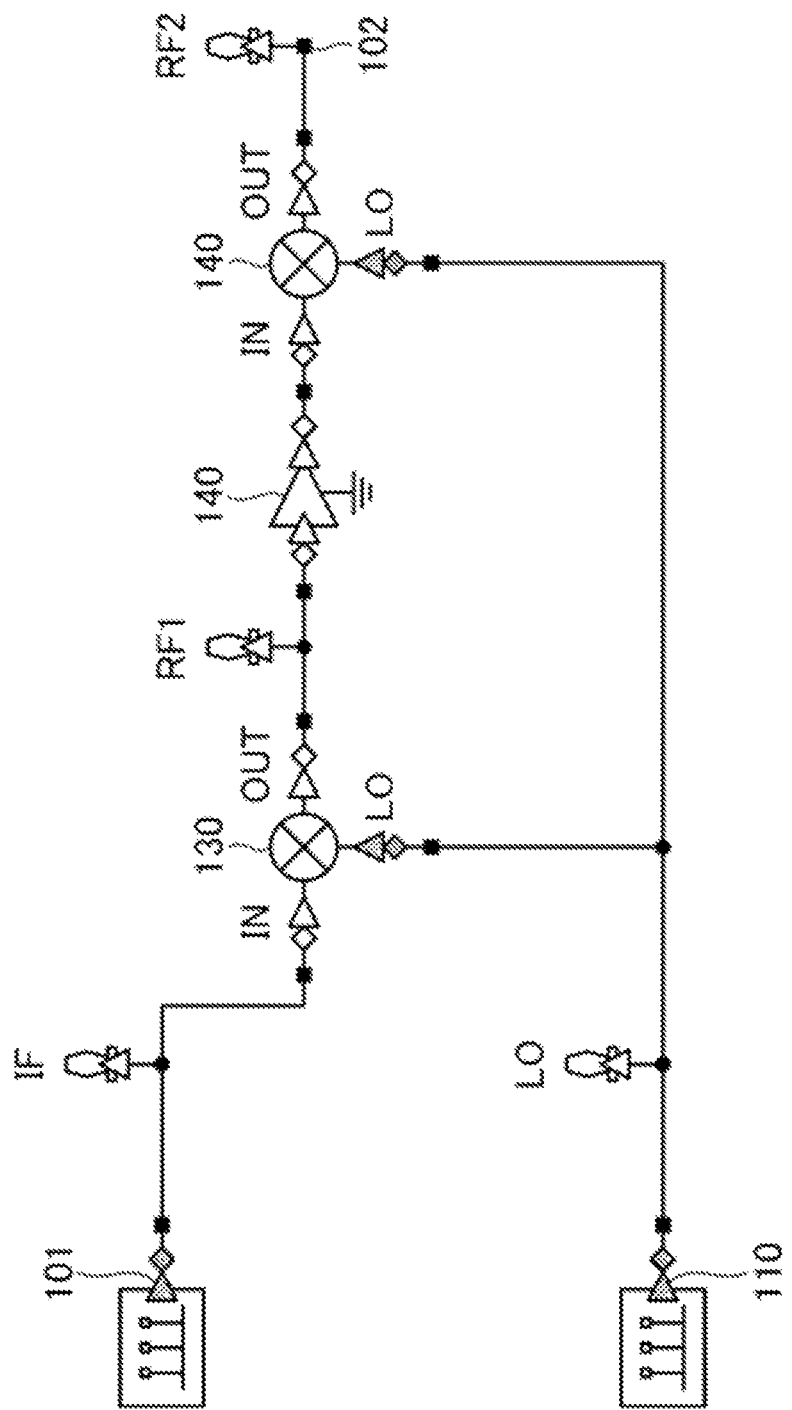
FIG. 12 is a diagram illustrating a simulation model of the transmission device 100M according to the modification of the first embodiment.

FIG. 12 is a diagram illustrating a simulation model of the transmission device 100M according to the modification of the first embodiment. In the simulation model illustrated in FIG. 12, the amplifier 160 having the amplification factor (gain) of 40 dB is added to the simulation model illustrated in FIG. 10. Other simulation conditions are the same as those of the simulation model illustrated in FIG. 10.

Figure 13:
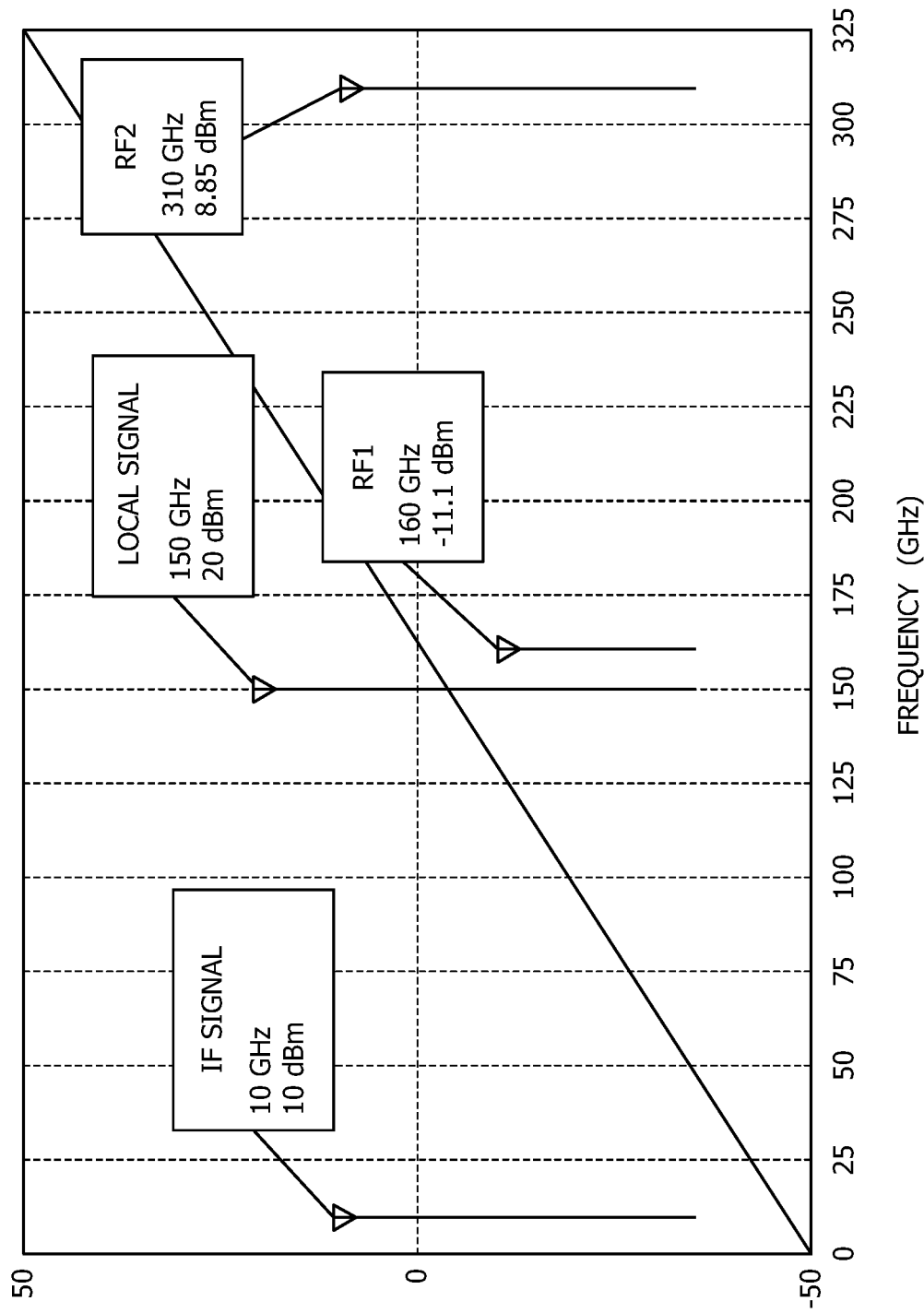
FIG. 13 is a diagram illustrating a simulation result regarding the transmission device 100M according to the modification of the first embodiment.

FIG. 13 is a diagram illustrating a simulation result regarding the transmission device 100M according to the modification of the first embodiment. When the IF signal (10 GHz, 10 dBm) and the local signal (150 GHz, 20 dBm) are input, the output signal RF1 is 160 GHz and −11.1 dBm that is the same as the result illustrated in FIG. 11. The output signal RF2 that is affected by the amplification of the amplifier 160 has been 310 GHz and 8.85 dBm. It can be confirmed that the output has been increased by about 40 dB as compared with the simulation result in FIG. 11.

As described above, it can be confirmed that the transmission signal RF of 8.85 dBM (about 7.67 mW) is obtained at 310 GHz (band of 300 GHz) is obtained using the local signal of 150 GHz. It is considered that the transmission devices 200, 200M1, and 200M2 according to the second embodiment can obtain the similar transmission signal RF.

Third Embodiment

Figure 14:
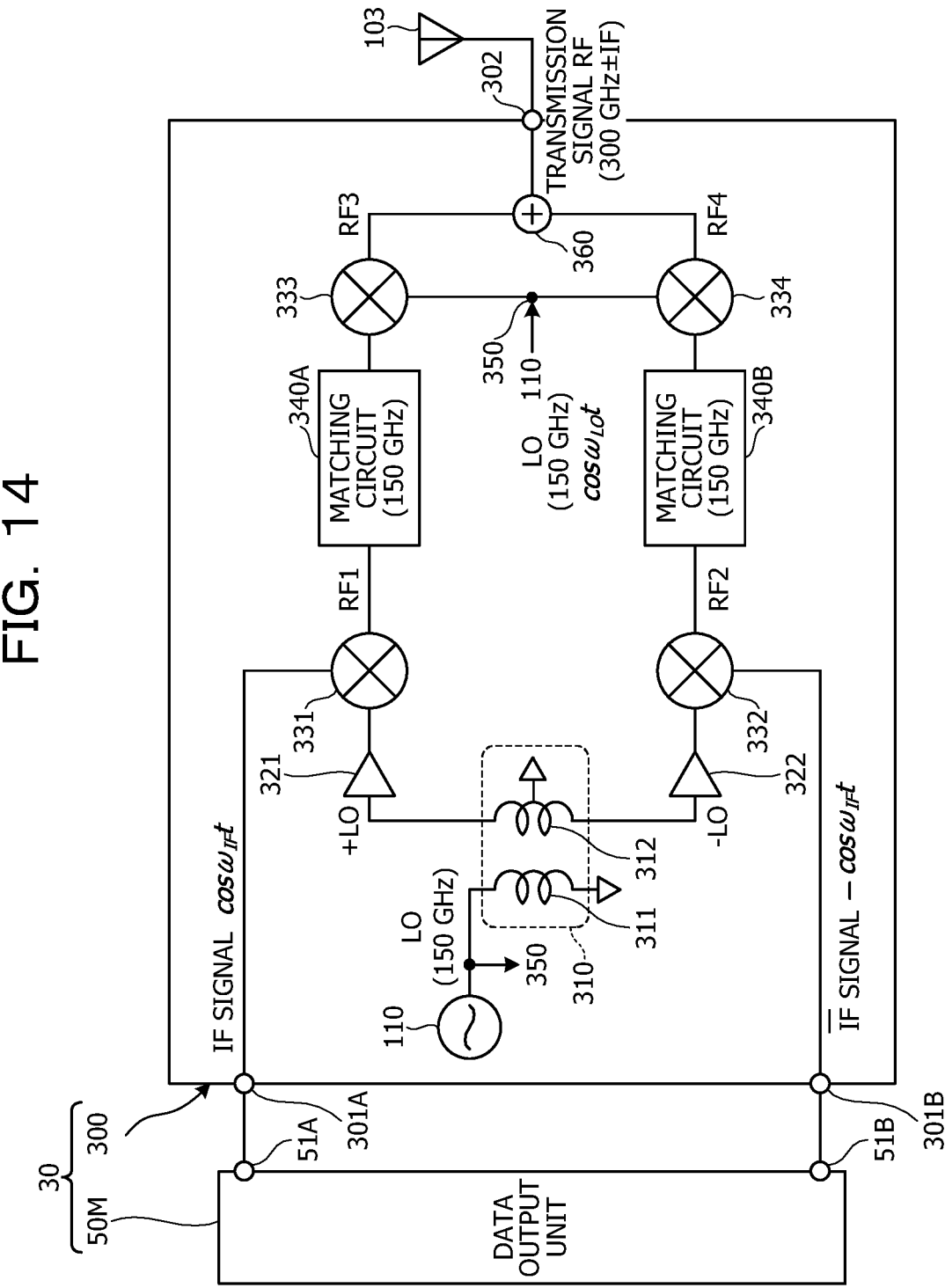
FIG. 14 is a diagram illustrating an example of a configuration of an electronic device 30 including a transmission device 300 according to a third embodiment.

FIG. 14 is a diagram illustrating an example of a configuration of an electronic device 30 including a transmission device 300 according to a third embodiment. FIGS. 15A to 15G are diagrams illustrating an example of a waveform of a signal obtained by each unit of the transmission device 300. In FIGS. 15A to 15G, the horizontal axis indicates a frequency, and the vertical axis indicates an amplitude.

As illustrated in FIG. 14, the electronic device 30 includes a data output unit 50M and the transmission device 300. Similarly to the electronic device 10 according to the first embodiment, the electronic device 30 is, for example, a smartphone, a tablet computer, other mobile devices having communication functions, or the like.

In the third embodiment, the data output unit 50M includes two output terminals 51A and 51B, and outputs an IF signal and an IF bar signal with an intermediate frequency respectively from the output terminals 51A and 51B. The IF bar signal is a signal of which a phase is different from the IF signal by 180 degrees and is a signal obtained by inverting the phase of the IF signal. The IF signal and the IF bar signal are differential input signals, are generated in the data output unit 50M, and are output from the output terminals 51A and 51B. The IF signal is an example of a first input signal, and the IF bar signal is an example of a second input signal.

The transmission device 300 includes input terminals 301A and 301B, an output terminal 302, a signal source 110, a balun 310, amplifiers 321 and 322, mixers 331 to 334, matching circuits 340A and 340B, a connection unit 350, and an adder 360. The mixers 331 to 334 are provided in two systems and at two stages for the IF signal and the IF bar signal.

The balun 310 is an example of a differential output unit. The amplifier 321 is an example of a first amplifier. The amplifier 322 is an example of a second amplifier. The mixers 331 to 334 are respective examples of a first mixer, a second mixer, a third mixer, and a fourth mixer.

The input terminal 301A is connected to an output terminal 51A of the data output unit 50M outside the transmission device 300, and the IF signal is input from the data output unit 50M. The input terminal 301A is connected to one input terminal of the mixer 331 in the transmission device 300.

The input terminal 301B is connected to an output terminal 51B of the data output unit 50M outside the transmission device 300, and the IF bar signal is input from the data output unit 50M. The input terminal 301B is connected to one input terminal of the mixer 332 in the transmission device 300.

The output terminal 302 is connected to an output terminal of the adder 360 in the transmission device 300 and is connected to an antenna 103 outside the transmission device 300. The output terminal 302 is a terminal that outputs a transmission signal RF obtained by performing frequency conversion and amplification on the IF signal and the IF bar signal by the transmission device 300. Note that, for example, a circuit that performs impedance matching or other processing may also be provided between the output terminal 302 and the antenna 103.

The signal source 110 outputs a local signal (LO). The signal source 110 is the same as the signal source 110 according to the first and second embodiments. A frequency LO of the local signal LO is 150 GHz, as an example. Although 150 GHz is close to an upper limit frequency of a signal that can be amplified by the amplifiers 321 and 322 that are achieved by a HEMT, 150 GHz is a frequency at which the HEMT can operate as the amplifiers 321 and 322 with excellent amplification characteristics. The output terminal of the signal source 110 is connected to an unbalanced side winding wire 311 of the balun 310 and the connection unit 350.

The balun 310 includes the unbalanced side winding wire 311 and a balanced side winding wire 312. One end of the balanced side winding wire 312 is connected to an input terminal of the amplifier 321, and another end is connected to an input terminal of the amplifier 322. The balun 310 generates local signals +LO and −LO from the local signal LO input from the signal source 110 and outputs the local signals. The local signal +LO has an amplitude, a frequency, and a phase equal to those of the local signal LO. The local signal +LO is the same as the local signal LO. The local signal −LO is a signal obtained by inverting the phase of the local signal +LO, and the phase of the local signal −LO is different from the phase of the local signal +LO by 180 degrees. The local signals +LO and −LO construct a differential signal.

As illustrated in FIG. 15A, the local signal +LO is a signal having a positive amplitude and can be represented by cos $\omega_{LO} \cdot t$. Furthermore, as illustrated in FIG. 15B, the local signal −LO is a signal having a negative amplitude and can be represented by −cos $\omega_{LO} \cdot t$.

The amplifier 321 includes an input terminal connected to the one end of the balanced side winding wire 312 and an output terminal connected to another input terminal of the mixer 331 and amplifies the local signal +LO input from the balun 310 and outputs the local signal to the mixer 331. The amplifier 321 is achieved by a HEMT.

The amplifier 322 includes an input terminal connected to the another end of the balanced side winding wire 312 and an output terminal connected to another input terminal of the mixer 332 and amplifies the local signal −LO input from the balun 310 and outputs the local signal to the mixer 332. The amplifier 322 is achieved by a HEMT. It is preferable to set an amplification factor of the amplifier 322 to be the same value as an amplification factor of the amplifier 321 in consideration of symmetry of a circuit.

The mixer 331 includes two input terminals connected to the input terminal 301A and the output terminal of the amplifier 321 and an output terminal connected to an input terminal of the matching circuit 340A. The mixer 331 mixes the IF signal input from the input terminal 301A and the local signal +LO amplified by the amplifier 321 and outputs the mixed signal to the matching circuit 340A as an output signal RF1. The output signal RF1 is an example of a first output signal.

Therefore, a frequency of the output signal RF1 is set as LO±IF. The frequency LO±IF is a band including 150 GHz. Furthermore, as illustrated in FIG. 15C, a waveform of the output signal RF1 is a waveform in which an IF signal having a frequency of LO±IF and a positive amplitude exists before and after a local signal +LO having a frequency LO and a positive amplitude.

The mixer 332 includes two input terminals connected to the input terminal 301B and the output terminal of the amplifier 322 and an output terminal connected to an input terminal of the matching circuit 340B. The mixer 332 mixes the IF bar signal input from the input terminal 301B and the local signal −LO amplified by the amplifier 322 and outputs the mixed signal to the matching circuit 340B as an output signal RF2. The output signal RF2 is an example of a second output signal.

Therefore, a frequency of the output signal RF2 is set as LO±IF. The frequency LO±IF is a band including 150 GHz. Furthermore, as illustrated in FIG. 15D, a waveform of the output signal RF2 is a waveform in which an IF signal having a frequency of LO±IF and a positive amplitude exists before and after a local signal −LO having a frequency LO and a negative amplitude.

The matching circuit 340A includes an input terminal connected to the output terminal of the mixer 331 and an output terminal connected to one input terminal of the mixer 333. The matching circuit 340A is an example of a first matching circuit. The matching circuit 340A is provided for impedance matching between the mixers 331 and 333 and makes the output signal RF1 output from the mixer 331 pass through.

The matching circuit 340B includes an input terminal connected to the output terminal of the mixer 332 and an output terminal connected to one input terminal of the mixer 334. The matching circuit 340B is an example of a second matching circuit. The matching circuit 340B is provided for impedance matching between the mixers 332 and 334 and makes the output signal RF2 output from the mixer 332 pass through.

The mixer 333 includes two input terminals connected to the output terminal of the matching circuit 340A and the connection unit 350 and an output terminal connected to one input terminal of the adder 360. The mixer 333 mixes the output signal RF1 output from the matching circuit 340A and the local signal LO input from the connection unit 350 and outputs the mixed signal to the adder 360 as an output signal RF3. The output signal RF3 is an example of a third output signal.

Therefore, a frequency of the output signal RF3 is set as 2×LO±IF. The frequency 2×LO±IF is a band including 300 GHz. As illustrated in FIG. 15E, a waveform of the output signal RF3 is a waveform of a local signal +2LO that has a frequency 2LO and a positive amplitude and an IF signal that has a frequency of 2LO±IF and a positive amplitude.

The mixer 334 includes two input terminals connected to the output terminal of the matching circuit 340B and the connection unit 350 and an output terminal connected to another input terminal of the adder 360. The mixer 334 mixes the output signal RF2 input from the matching circuit 340B and the local signal LO input from the connection unit 350 and outputs the mixed signal to the adder 360 as an output signal RF4. The output signal RF4 is an example of a fourth output signal.

Therefore, a frequency of the output signal RF4 is set as 2×LO±IF. The frequency 2×LO±IF is a band including 300 GHz. As illustrated in FIG. 15F, a waveform of the output signal RF4 is a waveform including a local signal −2LO that has a frequency 2LO and a negative amplitude and an IF signal that has a frequency of 2LO±IF and a positive amplitude.

The adder 360 includes two input terminals connected to the output terminal of the mixer 333 and the output terminal of the mixer 334 and an output terminal connected to the output terminal 302. The adder 360 adds the output signal RF3 input from the mixer 333 and the output signal RF4 input from the mixer 334.

When the output signals RF3 and RF4 are added, the result is as illustrated in FIG. 15G. Because the output signal RF3 including the local signal +2LO that has the frequency 2LO and the positive amplitude and the IF signal that has the frequency of 2LO±IF and the positive amplitude and the output signal RF4 including the local signal −2LO that has the frequency 2LO and the negative amplitude and the IF signal that has the frequency of 2LO±IF and the positive amplitude are added, the local signals +2LO and −2LO are cancelled, and the IF signal that has the frequency of 2LO±IF and the positive amplitude is obtained. A frequency of the IF signal illustrated in FIG. 15G is 300 GHz±IF, and an amplitude is twice of the IF signal illustrated in FIGS. 15C to 15F.

Here, an angular velocity of the IF signal is set as $\omega_{IF}$, and an angular velocity of the local signal is set as $\omega_{LO}$. A frequency obtained by the angular velocity $\omega_{LO}$ is 150 GHz. The local signal +LO is $\cos \omega_{LO} \cdot t$, the local signal −LO is $-\cos \omega_{LO} \cdot t$, the IF signal is $\cos(\omega_{IF} \cdot t)$, and the IF bar signal is $-\cos(\omega_{IF} \cdot t)$.

The output signal RF1 is $\cos \omega_{LO} \cdot t + \cos(\omega_{LO}+\omega_{IF}) t + \cos(\omega_{LO}-\omega_{IF}) t$, and the output signal RF2 is $-\cos \omega_{LO} \cdot t + \cos(\omega_{LO}+\omega_{IF}) t + \cos(\omega_{LO}-(\omega_{IF})) t$.

The output signal RF3 is $\cos \omega_{LO} \cdot t + \cos(2\omega_{LO}+\omega_{IF}) t + \cos(2\omega_{LO}-\omega_{IF}) t$, and the output signal RF4 is $-\cos \omega_{LO} \cdot t + \cos(2\omega_{LO}+\omega_{IF}) t + \cos(2\omega_{LO}-\omega_{IF}) t$.

Therefore, the output of the adder 360 is $2 \cos(2\omega_{LO}+\omega_{IF}) t + 2 \cos(2\omega_{LO}-\omega_{IF}) t$ obtained by adding the output signal RF3 $\cos \omega_{LO} \cdot t + \cos(2\omega_{LO}+\omega_{IF}) t + \cos(2\omega_{LO}-\omega_{IF}) t$ and the output signal RF4 $-\cos \omega_{LO} \cdot t + \cos(2\omega_{LO}+\omega_{IF}) t + \cos(2\omega_{LO}-\omega_{IF}) t$. The output of the adder 360 is a transmission signal RF.

Because a frequency obtained by the angular velocity $\omega_{LO}$ is 150 GHz, a frequency of the output of the adder 360 is a band of 300 GHz. In other words, for example, the frequency of the output signal RF output from the adder 360 is 2×LO+IF, and an IF signal having a frequency of 300 GHz±IF and an amplitude that is twice of the IF signal illustrated in FIGS. 15C to 15F is obtained as illustrated in FIG. 15G.

As described above, the local signals +LO and −LO obtained by the balun 310 are amplified and subsequently mixed into the IF signal and the IF bar signal, respectively, to generate the output signals RF1 and RF2. Then, the local signal LO is added to the output signals RF1 and RF2, thereby obtaining the output signals RF3 and RF4. When the output signals RF3 and RF4 are added, the local signal +2LO ($\cos \omega_{LO} \cdot t$ included in the output signal RF3 and the local signal −2LO ($-\cos \omega_{LO} \cdot t$ included in the output signal RF4 are cancelled, and the IF signal having the frequency of 2LO±IF and the amplitude that is twice of the original IF signal is obtained as the transmission signal RF. 2LO±IF is 300 GHz±IF.

Therefore, it is possible to provide the transmission device 300 and the electronic device 30 that can output the transmission signal RF in the frequency band exceeding the upper limit frequency of the semiconductor device.

Furthermore, since the transmission signal RF does not include the local signal +2LO and the local signal −2LO, it is possible to obtain only the IF signal having the frequency of 300 GHz±IF and the amplitude twice of that of the original IF signal.

Furthermore, as in the first and second embodiments, because the band of the IF signal is doubled without using a multiplier, the output signal transmission signal RF of 300 GHz with high accuracy and less errors is obtained.

Figure 16:
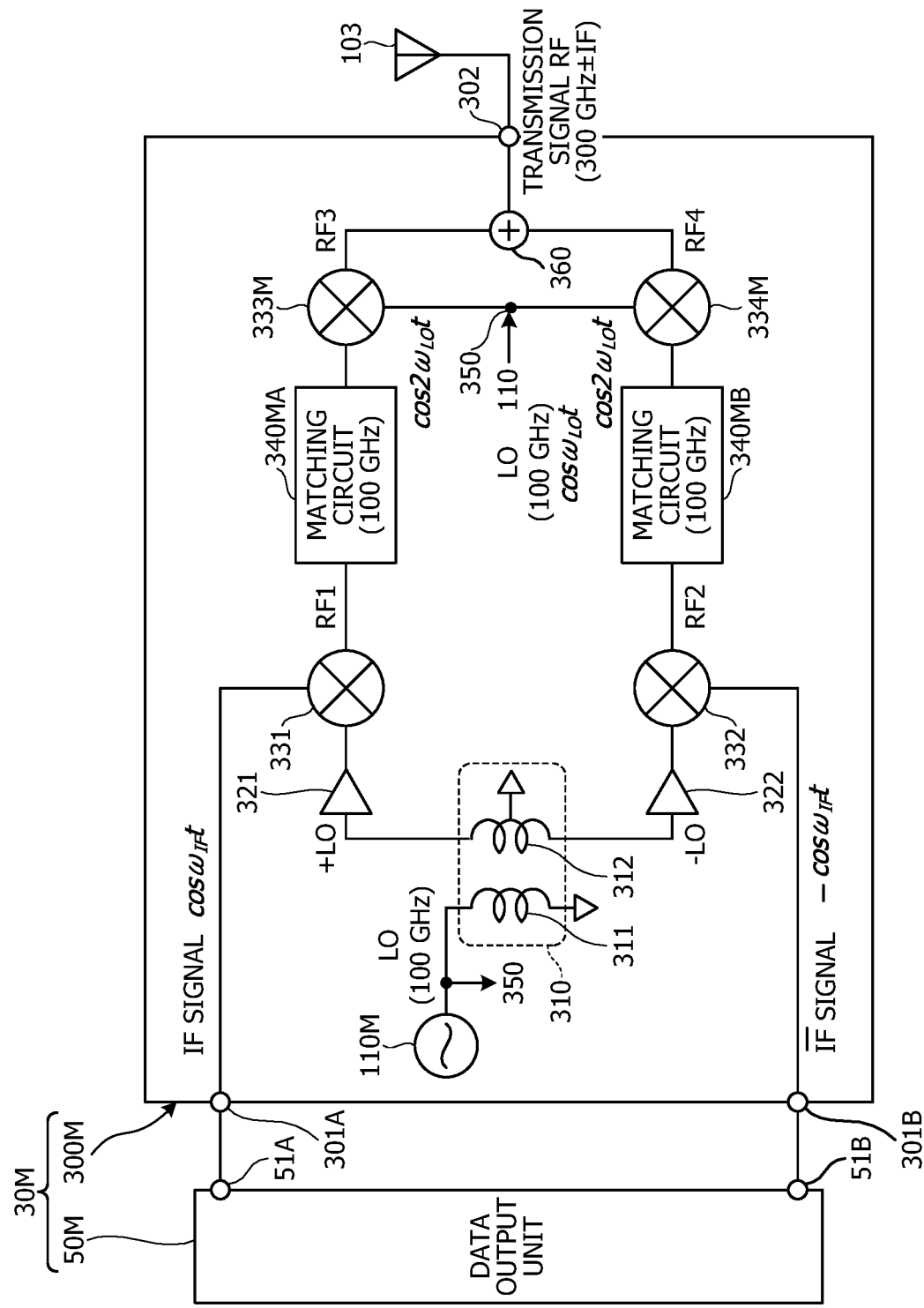
FIG. 16 is a diagram illustrating an example of a configuration of an electronic device 30M including a transmission device 300M according to a modification of the third embodiment.

FIG. 16 is a diagram illustrating an example of a configuration of an electronic device 30M including a transmission device 300M according to a modification of the third embodiment. FIGS. 17A to 17G are diagrams illustrating an example of a waveform of a signal obtained by each unit of the transmission device 300M. In FIGS. 17A to 17G, the horizontal axis indicates a frequency, and the vertical axis indicates an amplitude.

As illustrated in FIG. 16, the electronic device 30M includes the data output unit 50MM and the transmission device 300M. Similarly to the electronic device 30, the electronic device 30M is, for example, a smartphone, a tablet computer, other mobile devices having communication functions, or the like.

The transmission device 300M includes the input terminals 301A and 301B, the output terminal 302, a signal source 110M, a balun 310, amplifiers 321 and 322, mixers 331, 332, 333M, and 334M, matching circuits 340MA and 340MB, the connection unit 350, and the adder 360. The mixers 331, 332, 333M, and 334M are provided in two systems and at two stages for the IF signal and the IF bar signal. Hereinafter, differences from the transmission device 300 illustrated in FIG. 14 will be mainly described. The mixers 333M and 334M are respective examples of a third mixer and a fourth mixer.

The signal source 110M is different from the signal source 110 illustrated in FIG. 14 in that a local signal (LO) of 100

GHz is output. In the modification of the third embodiment, the frequency LO of the local signal LO is 100 GHz. Therefore, the signal source 110M has more margin than the signal source 110 according to the first embodiment with respect to the upper limit of the frequency of the signal that can be amplified by the amplifiers 321 and 322 that are achieved by the HEMT, and the amplifiers 321 and 322 that are achieved by the HEMT can operate with excellent amplification characteristics.

As illustrated in FIG. 17A, the local signal +LO is a signal having a positive amplitude and can be represented by cos $\omega_{LO}$·t. Furthermore, as illustrated in FIG. 17B, the local signal −LO is a signal having a negative amplitude and can be represented by −cos $\omega_{LO}$·t. The frequency LO is 100 GHz.

A frequency of the output signal RF1 output from the mixer 331 is LO±IF, and the frequency LO±IF is a band including 100 GHz. Furthermore, as illustrated in FIG. 17C, a waveform of the output signal RF1 is a waveform in which the IF signal having the frequency of LO±IF and a positive amplitude exists before and after the local signal +LO having the frequency LO and a positive amplitude.

Similarly, a frequency of the output signal RF2 output from the mixer 332 is LO±IF, and the frequency LO±IF is a band including 100 GHz. Furthermore, as illustrated in FIG. 17D, a waveform of the output signal RF2 is a waveform in which the IF signal having the frequency of LO±IF and a positive amplitude exists before and after the local signal −LO having the frequency LO and a negative amplitude.

The mixer 333M is different from the mixer 333 illustrated in FIG. 14 in that the mixer 333M is a harmonic mixer. The mixer 333M as a harmonic mixer creates a signal of 200 GHz internally using a distortion component (non-linear component) on the basis of the local signal LO input from the connection unit 350, mixes a signal of 200 GHz and the output signal RF1, and outputs an output signal RF3 of 300 GHz. The output signal RF3 output from the mixer 333M is an example of a third output signal.

Therefore, a frequency of the output signal RF3 is 3×LO±IF. The frequency 3× LO±IF is a band including 300 GHz. As illustrated in FIG. 17E, a waveform of the output signal RF3 is a waveform including a local signal +3LO that has a frequency 3LO and a positive amplitude and an IF signal that has a frequency of 3LO±IF and a positive amplitude.

The mixer 334M is different from the mixer 334 illustrated in FIG. 14 in that the mixer 334M is a harmonic mixer. The mixer 334M as a harmonic mixer creates a signal of 200 GHz internally using a distortion component (non-linear component) on the basis of the local signal LO input from the connection unit 350, mixes the signal of 200 GHz and the output signal RF2, and outputs an output signal RF4 of 300 GHz. The output signal RF4 output from the mixer 334M is an example of a fourth output signal.

Therefore, a frequency of the output signal RF4 is 3×LO±IF. The frequency 3× LO±IF is a band including 300 GHz. As illustrated in FIG. 17F, a waveform of the output signal RF4 is a waveform including a local signal −3LO that has a frequency 3LO and a negative amplitude and an IF signal that has a frequency of 3LO±IF and a positive amplitude.

The adder 360 includes two input terminals connected to an output terminal of the mixer 333M and an output terminal of the mixer 334M and an output terminal connected to the output terminal 302. The adder 360 adds the output signal RF3 input from the mixer 333M and the output signal RF4 input from the mixer 334M.

When the output signals RF3 and RF4 are added, the result is as illustrated in FIG. 17G. Because the output signal RF3 including the local signal +3LO that has the frequency 3LO and the positive amplitude and the IF signal that has the frequency of 3LO±IF and the positive amplitude and the output signal RF4 including the local signal −3LO that has the frequency 3LO and the negative amplitude and the IF signal that has the frequency of 3LO±IF and the positive amplitude are added, the local signals +3LO and −3LO are cancelled, and the IF signal that has the frequency of 3LO±IF and the positive amplitude is obtained. A frequency of the IF signal illustrated in FIG. 17G is 300 GHz±IF, and an amplitude is twice of the IF signal illustrated in FIGS. 17C to 17F.

Here, a frequency obtained by the angular velocity $\omega_{LO}$ is 100 GHz. The local signal +LO is cos $\omega_{LO}$·t, the local signal −LO is −cos $\omega_{LO}$·t, the IF signal is cos ($\omega_{IF}$·t), and the IF bar signal is −cos ($\omega_{IF}$·t).

The output signal RF1 is cos $\omega_{LO}$·t+cos ($\omega_{LO}$+$\omega_{IF}$) t+cos ($\omega_{LO}$−$\omega_{IF}$) t, and the output signal RF2 is −cos $\omega_{LO}$·t+cos ($\omega_{LO}$+$\omega_{IF}$) t+cos ($\omega_{LO}$−$\omega_{IF}$) t.

The output signal RF3 is cos 3$\omega_{LO}$·t+cos (3$\omega_{LO}$+$\omega_{IF}$) t+cos (3$\omega_{LO}$−$\omega_{IF}$) t, and the output signal RF4 is −cos 3$\omega_{LO}$·t+cos (3$\omega_{LO}$+$\omega_{IF}$) t+cos (3$\omega_{LO}$−$\omega_{IF}$) t.

Therefore, the output of the adder 360 is 2 cos (3$\omega_{LO}$+$\omega_{IF}$) t+2 cos (3$\omega_{LO}$−$\omega_{IF}$) t obtained by adding the output signal RF3 cos 3$\omega_{LO}$·t+cos (3$\omega_{LO}$+$\omega_{IF}$) t+cos (3$\omega_{LO}$−$\omega_{IF}$) t and the output signal RF4−cos 3$\omega_{LO}$·t+cos (3$\omega_{LO}$+$\omega_{IF}$) t+cos (3$\omega_{LO}$−$\omega_{IF}$) t.

Because a frequency obtained by the angular velocity $\omega_{LO}$ is 100 GHz, a frequency of the output of the adder 360 is a band of 300 GHz. In other words, for example, the frequency of the output signal RF output from the adder 360 is 3×LO+IF, and an IF signal having the frequency of 300 GHz±IF and the amplitude that is twice of the IF signal illustrated in FIGS. 17C to 17F is obtained as illustrated in FIG. 17G.

As described above, the local signals +LO and −LO obtained by the balun 310 are amplified and subsequently mixed into the IF signal and the IF bar signal, respectively, to generate the output signals RF1 and RF2. Then, the local signal LO is added to the output signals RF1 and RF2, thereby obtaining the output signals RF3 and RF4. When the output signals RF3 and RF4 are added, the local signal +3LO (cos 3$\omega_{LO}$·t) included in the output signal RF3 and the local signal −3LO (−cos 3$\omega_{LO}$·t) included in the output signal RF4 are cancelled, and the IF signal having the frequency of 300 GHz±IF and the amplitude that is twice of the original IF signal is obtained.

Therefore, it is possible to provide the transmission device 300M and the electronic device 30M that can output the transmission signal RF in a frequency band exceeding the upper limit frequency of the semiconductor device.

Furthermore, because the transmission signal RF does not include the local signals +3LO and −3LO, it is possible to obtain only the IF signal having the frequency of 300 GHz±IF and the amplitude twice of that of the original IF signal.

Furthermore, as in the first and second embodiments, because the band of the IF signal is doubled without using a multiplier, the output signal transmission signal RF of 300 GHz with high accuracy and less errors is obtained.

Furthermore, because the signal source 110M that outputs the local signal LO with the frequency lower than the first to the third embodiments can be used, the signal source 110M has more margin than the signal source 110 according to the first embodiment with respect to the upper limit of the frequency of the signal that can be amplified by the amplifiers 321 and 322 that are achieved by the HEMT, and the amplifiers 321 and 322 that are achieved by the HEMT can operate with excellent amplification characteristics.

Although the transmission device and the electronic device according to the exemplary embodiment of the present disclosure have been described above, the present disclosure is not limited to the embodiments disclosed in detail, and the various changes and alterations could be made hereto without departing from the scope of claims.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A transmission device comprising:
   a signal source configured to output a local signal with a first frequency;
   a first amplifier configured to amplify the local signal output from the signal source;
   a first mixer configured to mix a first input signal with an intermediate frequency and the local signal amplified by the first amplifier and to output a first output signal; and
   a second mixer configured to mix the first output signal output from the first mixer and the local signal amplified by the first amplifier and to output a second output signal.

2. The transmission device according to claim 1, further comprising:
   a second amplifier provided between the first mixer and the second mixer, and configured to amplify the first output signal output from the first mixer and to output the first output signal to the second mixer.

3. The transmission device according to claim 1, further comprising:
   a high-pass filter provided with an output side of the second mixer, and configured to pass through a signal in a band that includes a second frequency that is twice of the first frequency.

4. The transmission device according to claim 1, further comprising:
   a third mixer configured to mix a second input signal with the intermediate frequency and the local signal amplified by the first amplifier, the second input signal having a phase different from the first input signal by 90 degrees, and to output a third output signal;
   a fourth mixer configured to mix the third output signal output from the third mixer and the local signal amplified by the first amplifier and to output a fourth output signal;
   a phase shifter configured to adjust a phase of the fourth output signal to match phases of the second output signal and the fourth output signal; and
   an adder configured to add the second output signal and the fourth output signal of which the phases are matched.

5. The transmission device according to claim 4, further comprising:
   a high-pass filter provided with an output side of the adder, and configured to pass through a signal in a band that includes a second frequency that is twice of the first frequency.

6. The transmission device according to claim 4, further comprising:
   a second amplifier provided between the first mixer and the second mixer, and configured to amplify the first output signal output from the first mixer and to output the first output signal to the second mixer; and
   a third amplifier provided between the third mixer and the fourth mixer, and configured to amplify the third output signal output from the third mixer and to output the third output signal to the fourth mixer.

7. The transmission device according to claim 4, wherein the first amplifier includes
   a fourth amplifier that is provided between the signal source and the first mixer, amplifies the local signal output from the signal source, and outputs the local signal amplified by the fourth amplifier to the first mixer,
   a fifth amplifier that is provided between the signal source and the second mixer, amplifies the local signal output from the signal source, and outputs the local signal amplified by the fifth amplifier to the second mixer,
   a sixth amplifier that is provided between the signal source and the third mixer, amplifies the local signal output from the signal source, and outputs the local signal amplified by the sixth amplifier to the third mixer, and
   a seventh amplifier that is provided between the signal source and the fourth mixer, amplifies the local signal output from the signal source, and outputs the local signal amplified by the seventh amplifier to the fourth mixer.

8. The transmission device according to claim 7, wherein the fourth to seventh amplifiers are achieved by high electron mobility transistors.

9. The transmission device according to claim 1, further comprising:
   a third mixer configured to mix a second input signal with the intermediate frequency and a local signal amplified by the first amplifier, the second input signal having a phase different from the first input signal by 90 degrees, and to output a third output signal;
   a fourth mixer configured to mix the third output signal output from the third mixer and the local signal amplified by the first amplifier and to output a fourth output signal;
   a phase shifter configured to adjust a phase of the fourth output signal to match phases of the second output signal and the fourth output signal; and
   a subtractor configured to output a difference between the second output signal and the fourth output signal of which the phases are matched.

10. The transmission device according to claim 9, further comprising:
    a high-pass filter provided with an output side of the subtractor, and configured to pass through a signal in a band that includes a second frequency that is twice of the first frequency.

11. The transmission device according to claim 1, wherein the first amplifier includes
a fourth amplifier that is provided between the signal source and the first mixer, amplifies the local signal output from the signal source, and outputs the local signal amplified by the fourth amplifier to the first mixer, and
a fifth amplifier that is provided between the signal source and the second mixer, amplifies the local signal output from the signal source, and outputs the local signal amplified by the fifth amplifier to the second mixer.

12. The transmission device according to claim 1, wherein the first frequency is 150 GHz.

13. A transmission device comprising:
a signal source configured to output a local signal with a first frequency;
a differential output circuit coupled to an output side of the signal source, and configured to generate, from the local signal, a differential signal that includes a first local signal and a second local signal obtained by inverting a phase of the first local signal and to output the differential signal;
a first amplifier provided with an output side of the differential output circuit, and configured to amplify the first local signal;
a second amplifier provided with an output side of the differential output circuit, and configured to amplify the second local signal;
a first mixer configured to mix a first input signal with an intermediate frequency and the first local signal amplified by the first amplifier and to output a first output signal;
a second mixer configured to mix a second input signal obtained by inverting a phase of the first input signal and the second local signal and to output a second output signal;
a third mixer configured to mix the first output signal output from the first mixer and the local signal and to output a third output signal;
a fourth mixer configured to mix the second output signal output from the second mixer and the local signal and to output a fourth output signal; and
an adder configured to add the third output signal output from the third mixer and the fourth output signal output from the fourth mixer.

14. The transmission device according to claim 13, further comprising:
a first matching circuit provided between the first mixer and the third mixer, and configured to pass through a signal in a band of the first frequency; and
a second matching circuit provided between the second mixer and the fourth mixer, and configured to pass through the signal in the band of the first frequency.

15. The transmission device according to claim 13, wherein the third mixer is a harmonic mixer that mixes the first output signal output from the first mixer and the local signal and outputs the third output signal that has a frequency that is triple of the first frequency, and
wherein the fourth mixer is a harmonic mixer that mixes the second output signal output from the second mixer and the local signal and outputs the fourth output signal that has a frequency that is triple of the first frequency.

16. The transmission device according to claim 13, wherein the first amplifier and the second amplifier are achieved by high electron mobility transistors.

17. An electronic device comprising:
a data output device configured to output a first input signal with an intermediate frequency; and
a transmission device configured to include
a signal source configured to output a local signal with a first frequency,
a first amplifier configured to amplify the local signal output from the signal source,
a first mixer configured to mix the first input signal and the local signal amplified by the first amplifier and to output a first output signal, and
a second mixer configured to mix the first output signal output from the first mixer and the local signal amplified by the first amplifier and to output a second output signal.

18. The electronic device according to claim 17, wherein the data output device outputs the first input signal and a second input signal with the intermediate frequency, the second input signal having a phase different from the first input signal by 90 degrees, and
wherein the transmission device further includes
a third mixer configured to mix the second input signal and the local signal amplified by the first amplifier, and to output a third output signal,
a fourth mixer configured to mix the third output signal output from the third mixer and the local signal amplified by the first amplifier and to output a fourth output signal,
a phase shifter configured to adjust a phase of the fourth output signal to match phases of the second output signal and the fourth output signal, and
an adder configured to add the second output signal and the fourth output signal of which the phases are matched.

* * * * *